(12) United States Patent
Shin et al.

(10) Patent No.: US 9,760,126 B2
(45) Date of Patent: Sep. 12, 2017

(54) MOBILE TERMINAL

(71) Applicant: LG ELECTRONICS INC., Seoul (KR)

(72) Inventors: Choonghwan Shin, Seoul (KR); Seongchan Byun, Seoul (KR); Sanghoon Song, Seoul (KR); Insu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/823,750

(22) Filed: Aug. 11, 2015

(65) Prior Publication Data
US 2016/0070306 A1 Mar. 10, 2016

(30) Foreign Application Priority Data

Sep. 5, 2014 (KR) .................. 10-2014-0119217

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1626* (2013.01);
(Continued)

(58) Field of Classification Search
CPC ............. H04M 1/0268; H04M 1/0247; H04M 1/0214; H04M 1/022; H04M 1/0266; H04M 1/02; H04M 1/0212; H04M 1/0216; H04M 2250/16; G06F 1/1641; G06F 1/1652; G06F 3/0412; G06F 1/1615; G06F 2203/04102; G06F 1/1616; G06F 1/1681; G06F 1/1626; H05K 1/028; H05K 1/189

(Continued)

(56) References Cited

U.S. PATENT DOCUMENTS 6,653,919 B2 * 11/2003 Shih-Chung ............ G06F 1/162
24/303
2007/0133156 A1 * 6/2007 Ligtenberg ............ G06F 1/1616
361/679.27

(Continued)

FOREIGN PATENT DOCUMENTS

EP 2 421 231 A1 2/2012

*Primary Examiner* — Anthony Haughton
*Assistant Examiner* — Ingrid Wright
(74) *Attorney, Agent, or Firm* — Birch, Stewart, Kolasch & Birch, LLP

(57) ABSTRACT

A mobile terminal includes a first case, a second case relatively rotating with respect to the first case, coupling portions respectively coupled to ends of the first and second cases, to relatively rotate the first and second cases, and a display including a first portion formed on the first case, the first portion having at least one portion fixed to the first case, and a second portion integrally formed with the first portion, the second portion being disposed on the second case. The coupling portion includes a first connecting portion and a second connecting portion, respectively having one end portions fixed to the ends of the first and second cases to integrally rotate with the first and second cases, and rotating portions respectively coupled to the other end portions of the first and second connecting portions, to rotate the first and second connecting portions.

25 Claims, 33 Drawing Sheets

(52) U.S. Cl.
CPC .......... *G06F 1/1681* (2013.01); *H04M 1/022* (2013.01); *H04M 1/0216* (2013.01); *H04M 1/0268* (2013.01)

(58) Field of Classification Search
USPC ............ 361/679.21, 679.26, 679.27, 679.09; 455/575.1–575.4
See application file for complete search history.

(56) References Cited

U.S. PATENT DOCUMENTS

| | | |
|---|---|---|
| 2012/0307472 A1 | 12/2012 | Bohn et al. |
| 2013/0286551 A1* | 10/2013 | Ashcraft ............... G06F 1/1679 361/679.01 |
| 2013/0342090 A1 | 12/2013 | Ahn et al. |
| 2014/0042293 A1 | 2/2014 | Mok et al. |
| 2015/0233162 A1* | 8/2015 | Lee ........................ H04M 1/02 16/223 |

* cited by examiner

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2014-0119217, filed on Sep. 5, 2014 the contents of which is incorporated by reference herein in its entirety.

BACKGROUND OF THE DISCLOSURE

1. Field of the Disclosure

The present disclosure relates to a mobile terminal using a flexible display.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, in the case of a mobile terminal using a flexible display, the display may be slightly moved in a process of folding and then unfolding the display. In order to solve such a problem, a mechanical implementation of the mobile terminal is required.

SUMMARY OF THE DISCLOSURE

Therefore, an aspect of the detailed description is to provide a mobile terminal which can be folded and unfolded by various means.

Another aspect of the detailed description is to provide a mobile terminal which is not excessively curved when the mobile terminal is unfolded, and has cases not spaced apart from each other.

Still another aspect of the detailed description is to provide a mobile terminal in which a portion of an area to be displayed is exposed to the outside.

To achieve these and other advantages and in accordance with the purpose of this specification, as embodied and broadly described herein, a mobile terminal includes: a first case; a second case relatively rotating with respect to the first case; coupling portions respectively coupled to ends of the first and second cases, to relatively rotate the first and second cases; and a display including a first portion formed on the first case, the first portion having at least one portion fixed to the first case, and a second portion integrally formed with the first portion, the second portion being disposed on the second case, wherein the coupling portion includes: a first connecting portion and a second connecting portion, respectively having one end portions fixed to the ends of the first and second cases to integrally rotate with the first and second cases; and rotating portions respectively coupled to the other end portions of the first and second connecting portions, to rotate the first and second connecting portions.

In one exemplary embodiment, each of the first and second cases may include a first body and a second body, having electronic components built therein; and a first bending portion and a second bending portion, respectively extending from the first and second bodies, the first and second bending portions bending to surround the coupling portion. Each of the first and second bending portions may include a first wall portion and a second wall portion, respectively forming external appearances of upper and lower ends of the mobile terminal, and a first cover portion and a second cover portion, integrally formed with the first and second wall portions, the first and second cover portions being formed in the width direction of the mobile terminal.

In one exemplary embodiment, the one end portions of the first and second connecting portions may be respectively fixed to the first and second wall portions, so that the first and second cases rotate by relative rotation between the first and second connecting portions.

In one exemplary embodiment, the rotating portion may include a first rotating shaft and a second rotating shaft, respectively inserted and fixed into the first and second connecting portions, to be integrally rotatable with the first and second connecting portions; and an elastic member is coupled to the first and second rotating shafts to rotate the first and second rotating shafts.

In one exemplary embodiment, the coupling portions may be formed at the upper and lower ends of the mobile terminal, respectively.

In one exemplary embodiment, the rotating portion may further include a supporting portion supporting the first rotating shaft, the second rotating shaft, and the elastic member while surrounding the first rotating shaft, the second rotating shaft, and the elastic member.

In one exemplary embodiment, the first and second connecting portions may rotate along the outer circumference of the supporting portion. A projection may be formed at each of the first and second connecting portions, and latching portions allowing rotations of the first and second connecting portions to be restricted by contacts of the first and second connecting portions with the projections may be formed at the outer circumference of the supporting portion.

In one exemplary embodiment, protruding portions may be formed along the width directions at inner circumferential surfaces of the first and second cover portions to restrict the rotations of the first and second connecting portions, respectively.

In one exemplary embodiment, magnetic members may be respectively provided inside the first and second cover portions or in the first and second wall portions such that the first and second cover portions are adhered closely to each other when the state between the first and second cases is switched in an opened state.

In one exemplary embodiment, a gear may be formed at the outer circumference of the rotating portion, and a first gear and a second gear, corresponding to the gear of the rotating portion, may be respectively formed at portions of the first and second connecting portions, which are coupled to the rotating portion, to be gear-coupled to the rotating portion. Protruding portions may be formed along the width directions at inner circumferential surfaces of the first and second cover portions to restrict the rotations of the first and second connecting portions, respectively.

In one exemplary embodiment, a hollow portion may be formed inside the rotating portion, the first and second connecting portions may be flexible and integrally formed while passing through the hollow portion, and a first supporting shaft and a second supporting shaft, fixing the first and second connecting portions, may be formed at both ends of the first and second connecting portions, respectively.

In one exemplary embodiment, the first and second supporting shafts may be fixed to the first and second wall portions of the first and second cases, respectively.

In one exemplary embodiment, the first and second connecting portions may be integrally formed, and each of the first and second connecting portions may be a corrugated plate having a plurality of corrugations or a mesh.

In one exemplary embodiment, the rotating portion may be a click hinge which includes a housing fixed to the first and second wall portions, and a cam portion protruding from one side of the housing to be inserted into the first or second connecting portion, the camp portion rotating the first or second connecting portion.

In one exemplary embodiment, the rotating portions may be disposed at upper and lower ends of the coupling portion, respectively, and one or two cam portions may be used for each rotating portion. When one cam portion is used for each rotating portion, the cam portions may be located in the diagonal direction or disposed on the same line at the upper and lower ends of the coupling portion. A projection may be formed at the other side of the housing to be inserted into the first or second connecting portion exclusively from the cam portion.

In one exemplary embodiment, a first joint and a second joint, respectively inserted into the first and second connecting portions, may be formed at the rotating portion, and any one of the first and second joints may move in a long hole formed in a first or second connecting portion.

In one exemplary embodiment, the one end portions of the first and second connecting portions may be fixed to the first and second wall portions, respectively, and the other end portions of the first and second connecting portions may be fixed to the rotating portions, respectively.

In one exemplary embodiment, each of the first and second connecting portions may be a link or a zigzag spring.

In one exemplary embodiment, when each of the first and second connecting portions is a zigzag spring, the other end portions of the first and second connecting portions may be coupled to the rotating portion. The other ends of the first and second connecting portions may be respectively fixed to a first rotating plate and a second rotating plate, which are formed at an end of the rotating portion and rotatable independently from the rotating portion.

In one exemplary embodiment, the one end portions of the first and second connecting portions may be fixed to a first hook and a second hook, formed at the first and second cases, respectively, and the other end portions of the first and second connecting portions may be respectively a first coil spring and a second coil spring, which are mounted in a first accommodating portion and a second accommodating portion, recessed in the rotating portion.

In one exemplary embodiment, the rotating portion may include a cylinder portion formed at an end of the first connecting portion, the cylinder portion having a hole formed therein, and a hinge shaft formed at an end of the second connecting portion, the hinge shaft being inserted into the hole such that the first and second cases are rotatable.

In one exemplary embodiment, the first portion may include a first area formed on a front surface of the first case, a second area extending from the first area, the second area formed on a side surface of the first case, and a third area extending from the second area, the third area formed on an outer surface of the first case. A fingerprint recognition module may be disposed on a rear surface of the second area.

In one exemplary embodiment, the first case may include a first upper case formed to extend from the third area and a first lower case supporting the first upper case. The second case may include a second upper case formed under the second portion; a second lower case supporting the second upper case; and an edge portion formed at ends of the second upper case and the second lower case. A supporting member fixed to the second portion to be integrally movable with the second portion may be provided inside the edge portion, and the edge portion may be provided with a space in which the supporting member is movable.

In one exemplary embodiment, the second lower case may have a dividing portion formed to protrude toward the second upper case, an electromagnet may be disposed at one side of the dividing portion, and a magnet may be attached to the supporting portion, so that the supporting member is moved by the electromagnet and the magnet. A spring moving the supporting member when the state of the mobile terminal is switched to the opened state may be disposed in the space.

In one exemplary embodiment, supporting members may be provided inside the first and second cases, respectively, so that the first and second cases are adhered closely to each other when the state of the mobile terminal is switched to a closed state.

In one exemplary embodiment, the magnetic member may be formed at a portion where any guide portion is not formed.

In one exemplary embodiment, when the first case is smaller than the second case, magnetic members may be respectively provided at an end of the first case and a portion corresponding to the end of the first case in a portion of the second case.

The mobile terminal and the control method thereof according to the present disclosure provide advantages as follows.

When the mobile terminal having a flexible display is unfolded, the mobile terminal is not excessively curved.

Also, the cases are not spaced apart from each other when the mobile terminal is unfolded, and simultaneously, the cases can be adhered closely to each other when the mobile terminal is folded.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF EXEMPLARY EMBODIMENTS

Figure 1A:
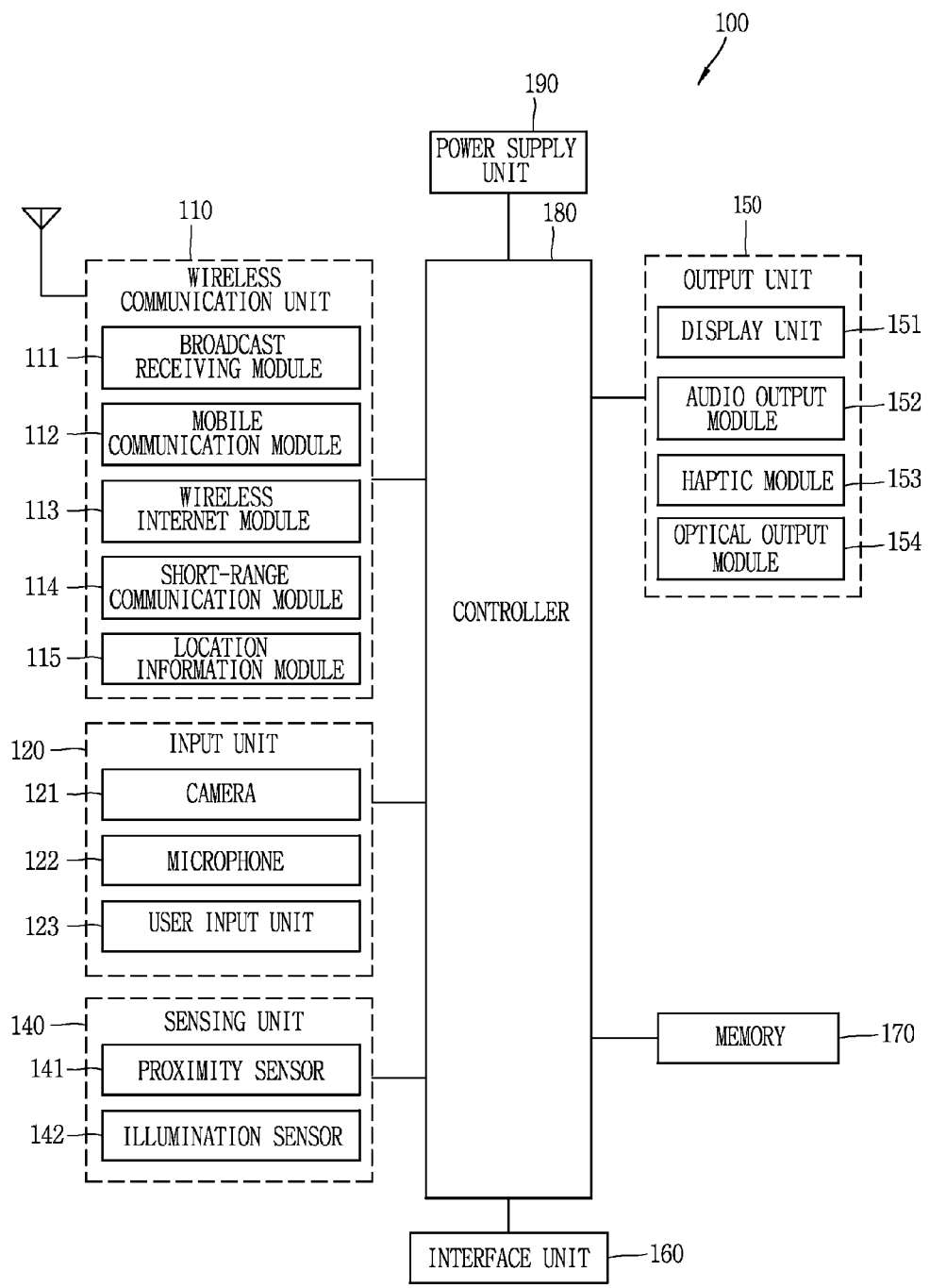
FIG. 1A is a block diagram illustrating a mobile terminal according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, a digital signage.

Figure 1B:
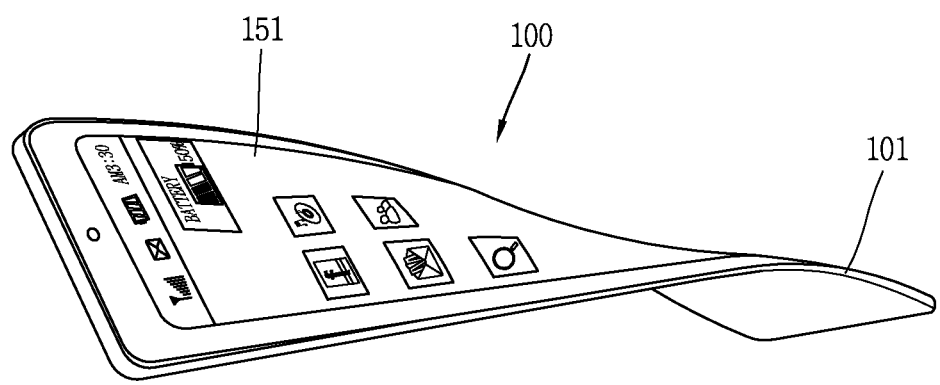
FIG. 1B is a conceptual view illustrating an example of a deformable mobile terminal according to an exemplary embodiment.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

FIG. 1B is a conceptual view of a deformable mobile terminal according to an alternative embodiment of the present invention. In this figure, the mobile terminal 100 is shown having a display unit 151, which is a type of display that is deformable by an external force. This deformation, which includes display unit 151 and other components of mobile terminal 100, may include any of curving, bending, folding, twisting, rolling, and combinations thereof. The deformable display unit 151 may also be referred to as a "flexible display unit." In some implementations, the flexible display unit 151 may include a general flexible display, electronic paper (also known as e-paper), and combinations thereof. In general, mobile terminal 100 may be configured to include features that are the same or similar to that of mobile terminal 100 of FIG. 1A.

The flexible display of mobile terminal 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 100 to include a deformation sensor which senses the deforming of the flexible display unit 151. The deformation sensor may be included in the sensing unit 140.

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second states.

In some embodiments, controller 180 or other component can change information displayed on the flexible display unit 151, or generate a control signal for controlling a function of the mobile terminal 100, based on the information related to the deforming of the flexible display unit 151. Such information is typically sensed by the deformation sensor.

The mobile terminal 100 is shown having a case 101 for accommodating the flexible display unit 151. The case 101 can be deformable together with the flexible display unit 151, taking into account the characteristics of the flexible display unit 151.

A battery (not shown in this figure) located in the mobile terminal 100 may also be deformable in cooperation with the flexible display unit 151, taking into account the characteristic of the flexible display unit 151. One technique to implement such a battery is to use a stack and folding method of stacking battery cells.

The deformation of the flexible display unit 151 not limited to perform by an external force. For example, the flexible display unit 151 can be deformed into the second state from the first state by a user command, application command, or the like.

Figure 2A:
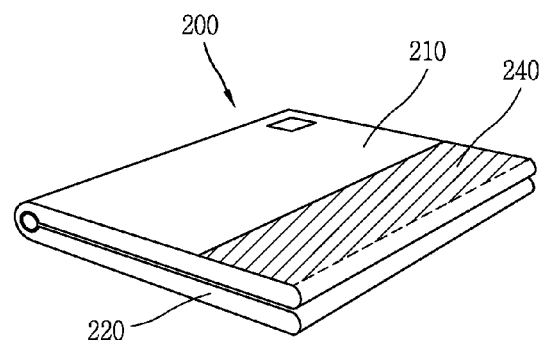
FIG. 2A is a perspective view of a mobile terminal in a closed state according to an exemplary embodiment.
Figure 2B:
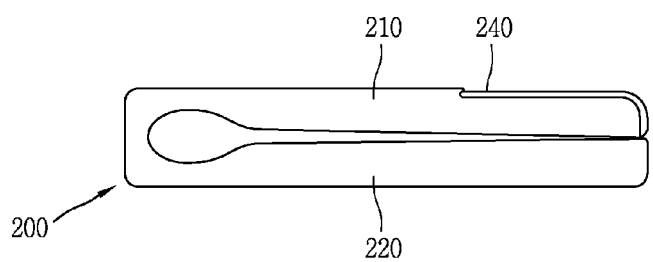
FIG. 2B is a side view of FIG. 2A.
Figure 2C:
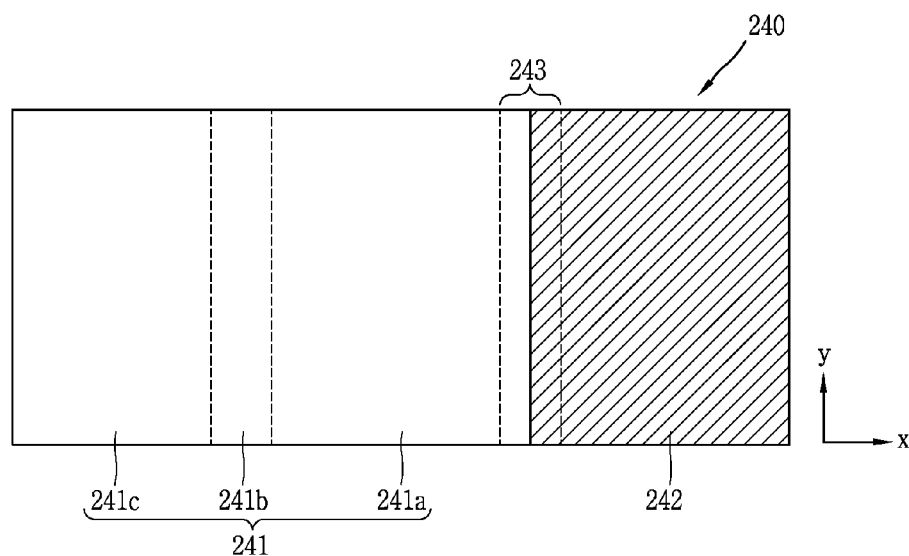
FIG. 2C is view illustrating areas of a display area in an opened state of the mobile terminal according to the exemplary embodiment.

First, FIG. 2A is a perspective view of a mobile terminal 200 in a closed state according to an exemplary embodiment, FIG. 2B is a side view of FIG. 2A, and FIG. 2C is view illustrating areas of a display 240 in an opened state of the mobile terminal 200.

Referring to FIG. 2, in the mobile terminal 200 according to the exemplary embodiment, a first case 210 and a second case 220 form an external appearance of the mobile terminal 200, and the display 240 is formed on the first and second cases 210 and 220. The display 240 is formed to be exposed to the outside in the closed state of the mobile terminal 200 while surrounding at least one end of the first and second cases 210 and 220.

According to an exemplary embodiment, a flexible display 240 is used as the display 240 displaying image signals. By using the flexible display 240, the use convenience of a user can be improved. In this case, the display 240 according to the exemplary embodiment may be divided into a plurality of areas 241*a*, 241*b*, 241*c*, and 242 while being integrally formed with the first and second cases 210 and 220. The display 240 divided into the plurality of areas may display different image signals according to the respective areas 241*a*, 241*b*, 241*c*, and 242. In an opened state in which the display 240 is unfolded, the display 240 may form one single screen. As such, it may be controlled by the controller 180 whether different image signals are to be individually displayed in the plurality of areas of the display or whether the entire display 240 is to display a single image signal.

According to an exemplary embodiment, the display 240 may be divided into a first portion 241 formed on the first case 210 and a second portion 242 formed on the second case 220. The first case 210 may be a case disposed at an upper portion in the closed state of the mobile terminal 200, and the second case 220 may be a case disposed at a lower portion in the closed state of the mobile terminal 200.

The first portion 241 includes a first area 241*a* formed on an inner surface of the first case 210, a second area 241*b* extending from the first area 241*a*, the second area 241*b* formed on a side surface of the first case 210, and a third area 241*c* extending from the second area 241*b*, the third area 241*c* formed on an outer surface of the first case 210. At least one portion of the first portion 241 may be fixed to the first case 210. For example, the third area 241*c* may be fixed to a top surface of the first case 210, or the third and second areas 241*c* and 241*b* may be fixed to the first case 210. However, in order to implement a structure in which when the mobile terminal 200 is unfolded, the display 240 is pushed, a portion or the entire portion of the third area 241*c* that is an end portion of the display 240 is preferably fixed to the first case 210.

According to an exemplary embodiment, in the display 240, only the third area 241*c* may be formed separately from the other areas 241*a*, 241*b*, and 242, or the second third areas 241*b* and 241*c* may be formed separately from the first area 241*a* and the second portion 242. In this case, when only the third area 241*c* is separately formed, at least one portion of the second or first area 241*b* or 241*a* is to be fixed to the first case 210. When the second and third areas 241*b* and 241*c* are formed separately from the first area 241*a* and the second portion 242, at least one portion of the first area 241*a* is to be fixed to the first case 210. This is for the purpose that the display 240 is pushed when the mobile terminal 200 is unfolded.

For convenience, in the present disclosure, it is described that the second and third areas 241*b* and 241*c* of the display 240 are formed on the first case 210, and as the mobile terminal 200 is opened/closed, the display 240 slidingly moves while the second portion 242 of the display 240 is formed on a front surface of the second case 220.

Hereinafter, the 'opened state' includes not only a case where the display 240 is flatly unfolded but also a state in which the display 240 is folded with a predetermined angle. That is, the 'opened state' means that as a plurality of areas of the display 240, disposed on the inner surface of the mobile terminal 200 are partially or entirely unfolded, the plurality of areas are exposed to the front surface. The opened state, as shown in FIG. 2C, includes a case where the first area 241*a* of the first portion 241 and the second portion 242 are flatly unfolded, and simultaneously, the second and third areas 241*b* and 241*c* of the first portion 241 form the same plane.

Particularly, in an exemplary embodiment, only the first area 241*a* of the first portion 241 may be unfolded to form the same plane as the second portion 242, and the second and third areas 241*b* and 241*c* may be folded at the end of the first case 210. As shown in FIG. 20, the first to third areas 241*a*, 241*b*, and 241*c* of the first portion 241 and the second portion 242 may be unfolded to form the same plane. This is as if a book is unfolded.

Hereinafter, the former case is referred to as a first opened state, and the latter case is referred to as a second opened state. However, it is unnecessary that the first area 241*a* and the second portion 242 necessarily form the same plane in the first and second opened states, and the first and second opened states also include a folded state to the extent where the user can recognize information displayed on the display 240.

The 'closed state' means a state in which the first area 241*a* of the first portion 241 and the second portion 242 face each other not to be exposed to the outside. In this state, the second and third areas 241*b* and 241*c* are also formed in a state in which the second and third areas 241*b* and 241*c* are folded on the first case 210.

Meanwhile, the state of the mobile terminal 200 may be switched from the first or second opened state to a "folded state," or vice versa. Here, the "folded state" means a state in which the first area 241*a* and the second portion 242 are formed with a predetermined angle in the first or second opened state (see FIG. 17).

Figure 3A:
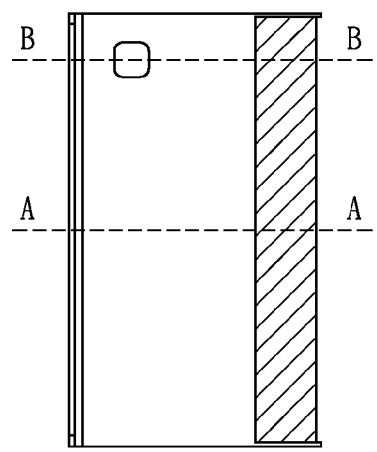
FIG. 3A is a plan view illustrating a state in which the mobile terminal is closed according to an exemplary embodiment.
Figure 3B:
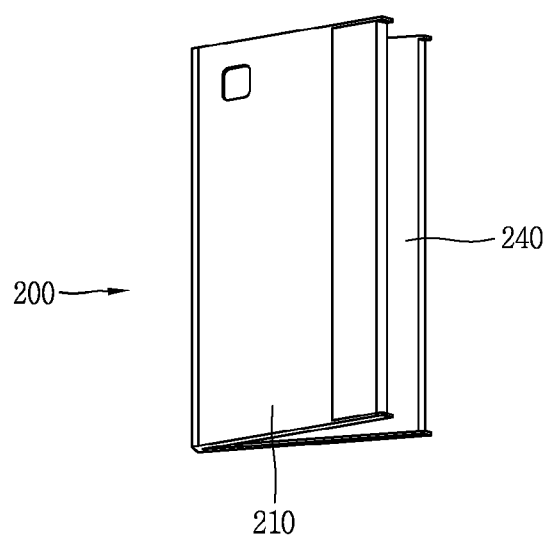
FIG. 3B is a perspective view illustrating a state in which a portion of the mobile terminal of FIG. 3A is opened.

FIG. 3A is a plan view illustrating a state in which the mobile terminal 200 is closed according to an exemplary embodiment, and FIG. 3B is a perspective view illustrating a state in which a portion of the mobile terminal 200 of FIG. 3A is opened. As shown in FIGS. 3A and 3B, an edge of the mobile terminal 200 according to the exemplary embodiment further protrudes to the outside as compared with the display 240, so that when the mobile terminal 200 falls, impact is not transferred to the display 240 but transferred to the first and second cases 210 and 220.

Figure 4A:
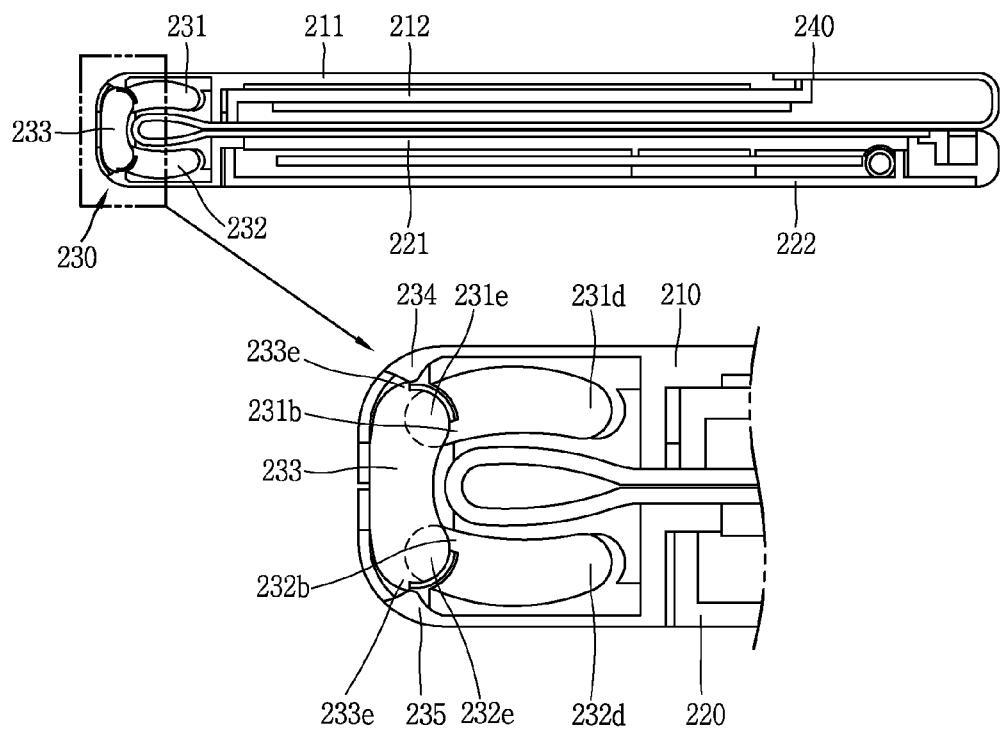
FIG. 4A is a sectional view taken along line A-A of FIG. 3A.
Figure 4B:
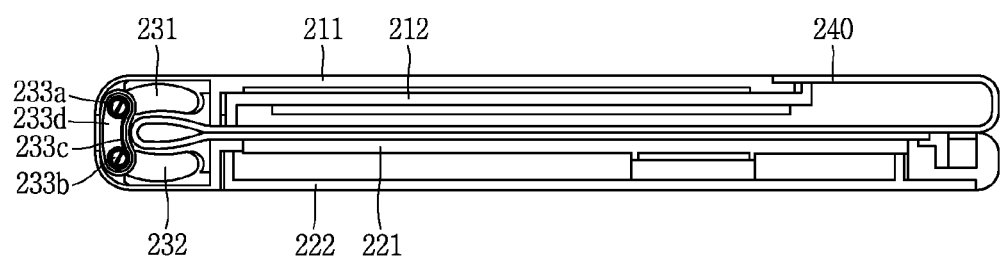
FIG. 4B is a sectional view taken along line B-B of FIG. 3A.
Figure 5:
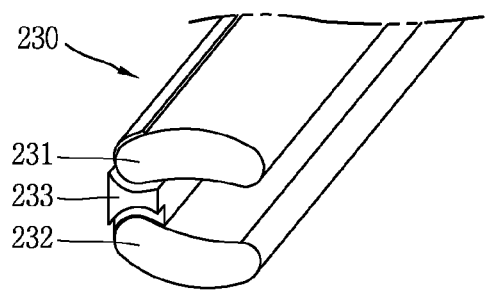
FIG. 5 illustrates an example of a coupling portion according to an exemplary embodiment.
Figure 6A:
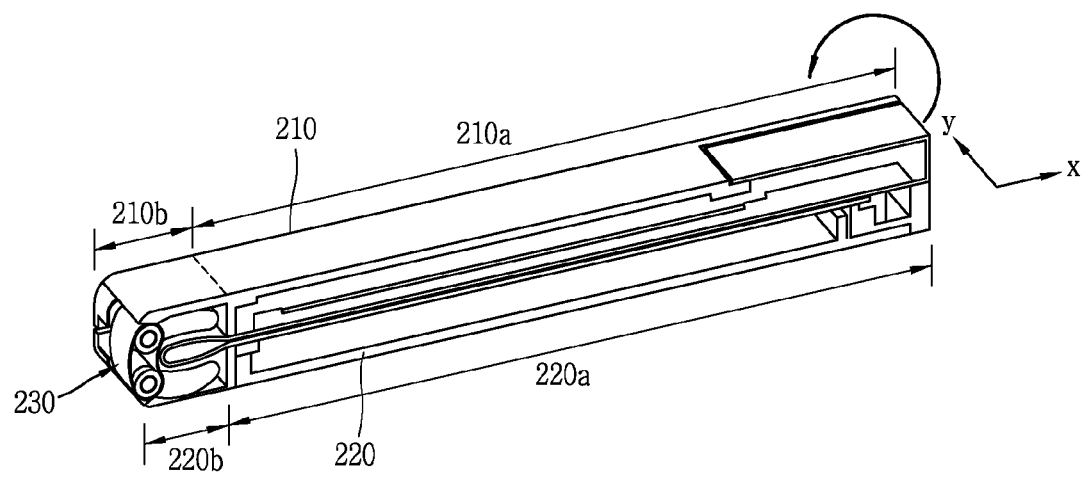
FIG. 6A is a perspective view of a portion taken along line B-B of FIG. 3A.
Figure 6B:
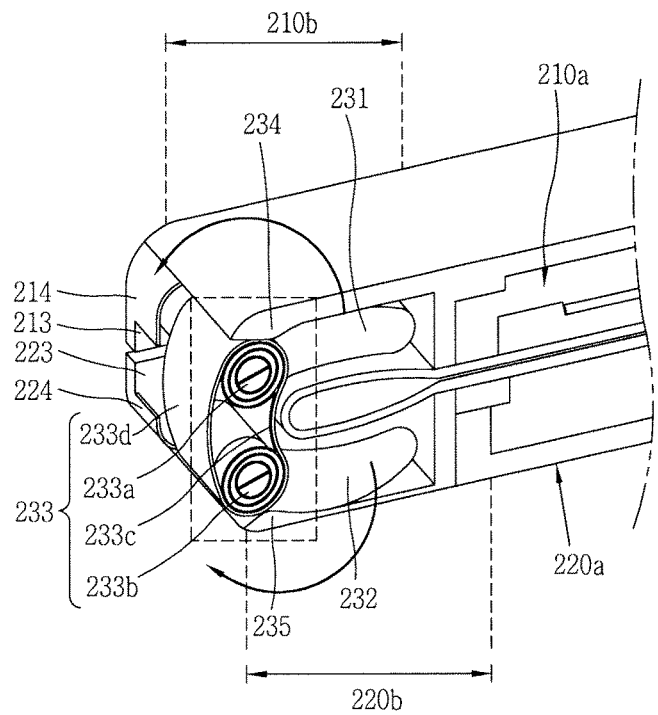
FIG. 6B is a partial enlarged view of FIG. 6A.
Figure 6C:
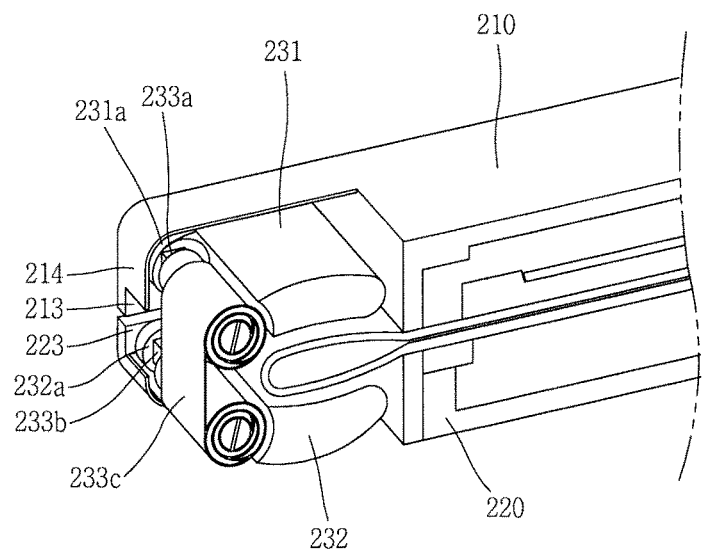
FIG. 6C is a perspective view illustrating a state in which a portion is removed in FIG. 6B.

FIG. 4A is a sectional view taken along line A-A of FIG. 3A, and FIG. 4B is a sectional view taken along line B-B of FIG. 3A. FIG. 5 illustrates an example of a coupling portion 230 according to an exemplary embodiment. FIG. 6A is a perspective view of a portion taken along line B-B of FIG. 3A, FIG. 6B is a partial enlarged view of FIG. 6A, and FIG. 6C is a perspective view illustrating a state in which a portion of the first case 210 is removed in FIG. 6B.

Referring to FIGS. 4 to 6, in the mobile terminal 200 according to the exemplary embodiment, the coupling portion 230 is formed at a portion where the first and second cases 210 and 220 are connected to each other. The coupling portion 230 is coupled to ends of the first and second cases 210 and 220 such that the first and second cases 210 and 220 can relatively rotate with respect to each other. The coupling portion 230 includes a first connecting portion 231 having one end portion 231d fixed to the end of the first case 210 to integrally rotate with the first case 210, a second connecting portion 232 having one end portion 232d fixed to the end of the second case 220 to integrally rotate with the second case 220, and a rotating portion 233 coupled to the other end portions 231e and 232e of the first and second connecting portions 231 and 232, to rotate the first and second connecting portions 231 and 232. In this case, a bending portion 243 (see FIG. 2C) connecting the first and second portions 241 and 242 to each other is bent with a predetermined radius in the closed state of the mobile terminal 200. That is, the bending portion 243 means a portion at which the display 240 is bent so as to maintain the closed state.

Meanwhile, in an exemplary embodiment, the first case 210 may include a first body 210a having electronic components built therein, the first body 210a formed in the length direction (X direction in FIG. 6A) of the mobile terminal 200, and a first bending portion 210b extending from the first body 210a, the first bending portion 210b bending to surround the coupling portion 230. Also, the second case 220 may include a second body 220a having electronic components built therein, the second body 220a formed in the length direction (X direction in FIG. 6A) of the mobile terminal 200, and a second bending portion 220b extending from the second body 220a, the second bending portion 220b bending to surround the coupling portion 230.

The first and second bodies 210a and 220a are formed to face each other in the closed state. Also, the first and second bending portions 210b and 220b are formed to face each other.

As described above, in the exemplary embodiment, the mobile terminal 200 includes the first and second cases 210 and 220. In this case, the first and second cases 210 and 220 have structures similar to each other. Therefore, hereinafter, it will be understood that the terms "first" and "second" used while indicating portions of the first and second cases 210 and 220 are respectively related to the first and second cases 210 and 220, except special cases. For example, a first cover portion 214 means one portion of the first case 210, and a second cover portion 224 means one portion of the second case 220. In addition, identical or similar elements are designated by identical or similar reference numerals, and their descriptions will be omitted to avoid redundancy. That is, last two numbers in a reference numeral indicate the same portion in the following various exemplary embodiments, except special cases.

The first bending portion 210b includes a first wall portion 213 forming the external appearance of an upper end of the mobile terminal 200, and the first cover portion 214 integrally formed with the first wall portion 213, the first cover portion 214 being formed in the width direction (Y direction in FIG. 2C) of the mobile terminal 200. Like the first bending portion 210b, the second bending portion 220b includes a second wall portion 223 forming the external appearance of a lower end of the mobile terminal 200, and the second cover portion 224 integrally formed with the second wall portion 223, the second cover portion 224 being formed in the width direction (Y direction in FIG. 2C) of the mobile terminal 200. In this case, the upper and lower ends respectively mean upper and lower portions in the state in which the mobile terminal 200 is opened as shown in FIG. 2C, and the width direction means a height of the mobile terminal 200 in FIG. 2C.

The first and second wall portions 213 and 223 are formed to extend from the first and second body 210a and 220a, respectively. The first and second wall portions 213 and 223 are integrally formed with vertical portions 213a and 223a, respectively.

The above-described details can be applied to the following various exemplary embodiments, and therefore, their detailed descriptions will be omitted in the following various exemplary embodiments.

In an exemplary embodiment, one end portions of the first and second connecting portions 231 and 232 are fixed to the first and second wall portions 213 and 223, so that the first and second cases 210 and 220 are rotated by rotations of the first and second connecting portions 231 and 232, respectively. To this end, the rotating portion 233 includes a first rotating shaft 233a having one end portion inserted and fixed into the first connecting portion 231, to be integrally rotatable with the first connecting portion 231, a second rotating shaft 233b having one end portion inserted and fixed into the second connecting portion 232 to be integrally rotatable with the second connecting portion 232, and an elastic member 233c formed at the first and second rotating shafts 233a and 233b to rotate the first and second rotating shafts 233a and 233b. The first and second connecting portions 231 and 232 may be attached to the first and second wall portions 213 and 223, respectively, and the elastic member 233c may be formed to surround the first and second rotating shafts 233a and 233b.

In this case, the elastic member 233c is sufficient as long as it is a member capable of providing a restoring force to the rotations of the first and second connecting portions 231 and 232. Therefore, the elastic member 233c is not particularly limited herein. For example, the elastic member 233c may be a spiral spring which can be simultaneously wound or unwound at both sides thereof.

The first connecting portion 231 and the second connecting portion 232 are provided with a first bottom portion 231a and a second bottom portion 232a, inserted and fixed into the first wall portion 213 and the second wall portion 223, respectively. That is, as shown in FIG. 6C, the first and second connecting portions 231 and 232 are fixed to the first and second wall portions 213 and 223, respectively, and the first and second bottom portions 231a and 232a are provided such that the first and second rotating shafts 233a and 233b are fixed to the first and second connecting portions 231 and 232, respectively. Accordingly, the first and second rotating shafts 233a and 233b are inserted and fixed into the first and second bottom portions 231a and 232a, respectively.

The elastic member 232c may be, for example, a spiral spring. Here, the spiral spring winds the outer circumferential surfaces of the first and second rotating shafts 233a and 233b plural times to have a restoring force. In this case, if the sections of the first and second rotating shafts 233a and 233b are formed in a polygonal or elliptical shape, the first and second connecting portions 231 and 232 can be rotated by the rotations of the first and second rotating shafts 233a and 233b, respectively. However, the present disclosure is not limited thereto, and it is sufficient that the elastic member 233c has a structure in which the first and second connecting portions 231 and 232 can be rotated by the rotations of the first and second rotating shafts 233a and 233b, respectively.

The coupling portion 230 may be formed at both ends in the width direction of the mobile terminal 200. However, the present disclosure is not limited thereto, and the coupling portion 230 may be formed at a middle portion. This is identically applied to coupling portions which will be described later.

As shown in FIG. 6B, the first rotating shaft 233a, the second rotating shaft 233b, and the elastic member 233c are surrounded by a supporting portion 233d. Here, the supporting portion 233d also functions to support the first rotating shaft 233a, the second rotating shaft 233b, and the elastic member 233c. The inside of the supporting member 233d may be filled at a portion except the portion surrounding the first rotating shaft 233a, the second rotating shaft 233b, and the elastic member 233c.

Figure 7A:
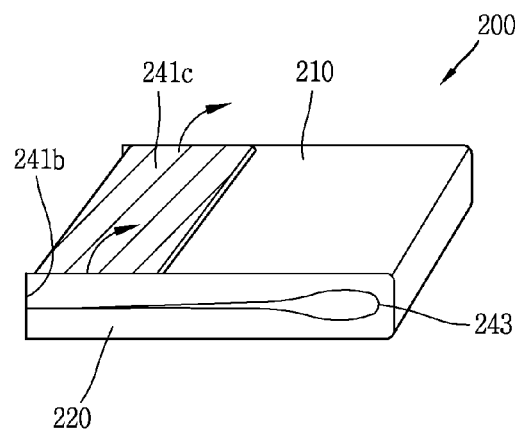
FIG. 7A is a perspective view illustrating a closed state of the mobile terminal in a closed state according to an exemplary embodiment.
Figure 7B:
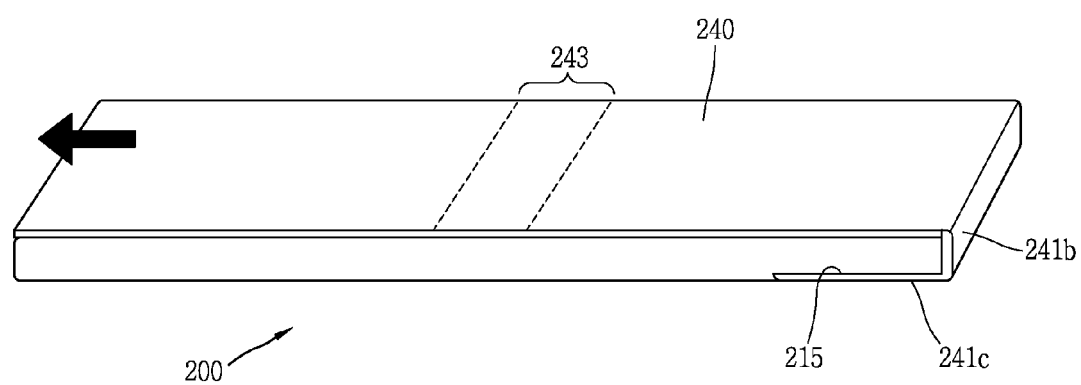
FIG. 7B is a perspective view a state in which the mobile terminal of FIG. 7A is unfolded.

FIG. 7A is a perspective view illustrating a closed state of the mobile terminal 200 according to an exemplary embodiment, and FIG. 7B is a perspective view a state in which the mobile terminal 200 of FIG. 7A is unfolded. FIG. 7A is slightly exaggerated for helping of understanding.

As shown in FIG. 7B, the display 240 is slightly pushed in the direction of an arrow when the state of the mobile terminal 200 is switched from the closed state to the opened state. This is because the bending portion 243 is formed to has a predetermined curvature as shown in FIG. 7A, so that as a portion corresponding to the bending portion 243 becomes a straight line (plane), the portion is formed to a length greater than that in the closed state. In this case, a recess portion 215 is formed in the surface of the first case 210 such that the third area 241c does not protrude to the outside.

Figure 8:
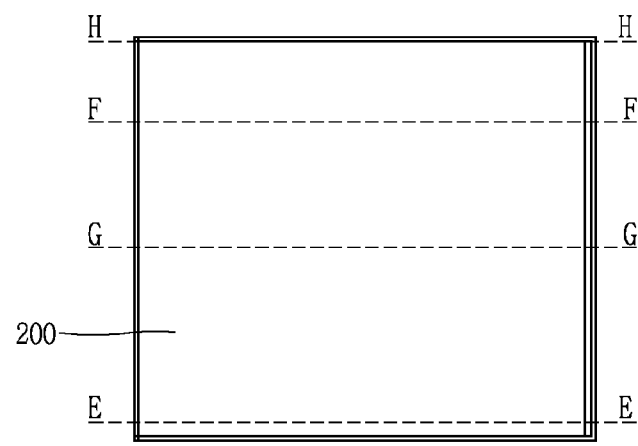
FIG. 8 is a plan view of FIG. 7B.
Figure 9A:
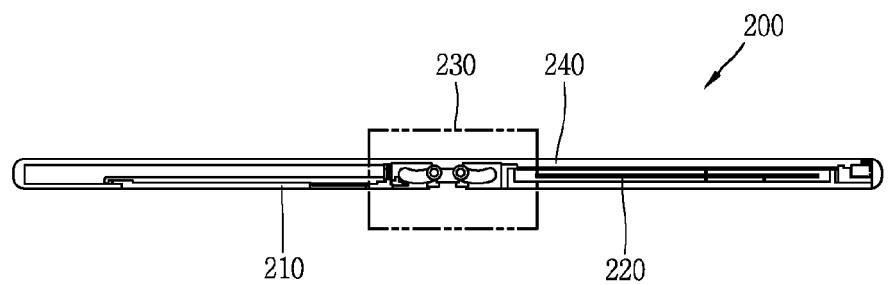
FIG. 9A is a sectional view taken along line F-F of FIG. 8.
Figure 9B:
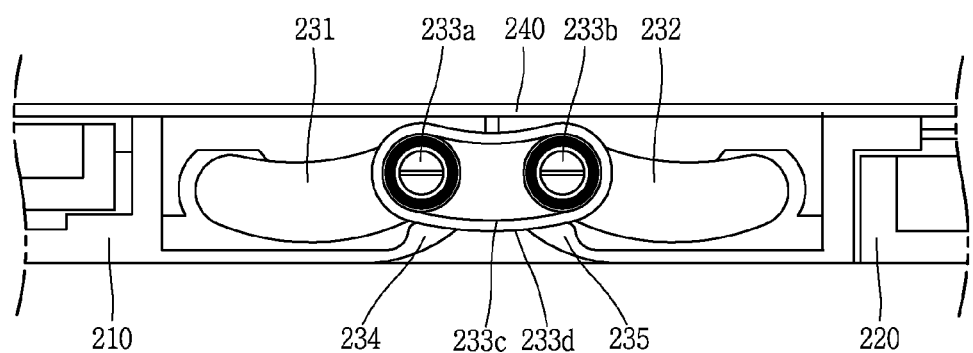
FIG. 9B is a partial enlarged view of FIG. 9A.
Figure 10A:
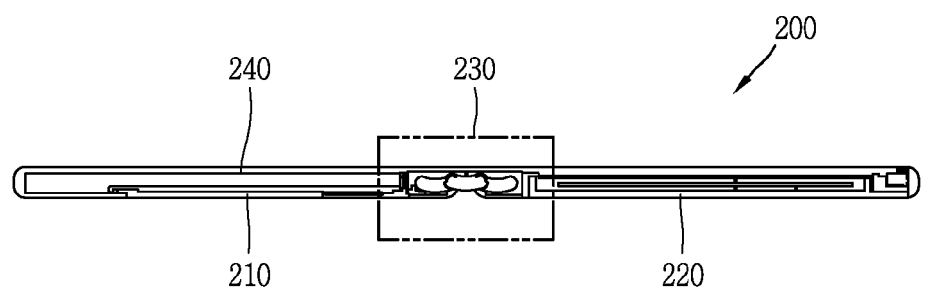
FIG. 10A is a sectional view taken along line G-G of FIG. 8.
Figure 10B:
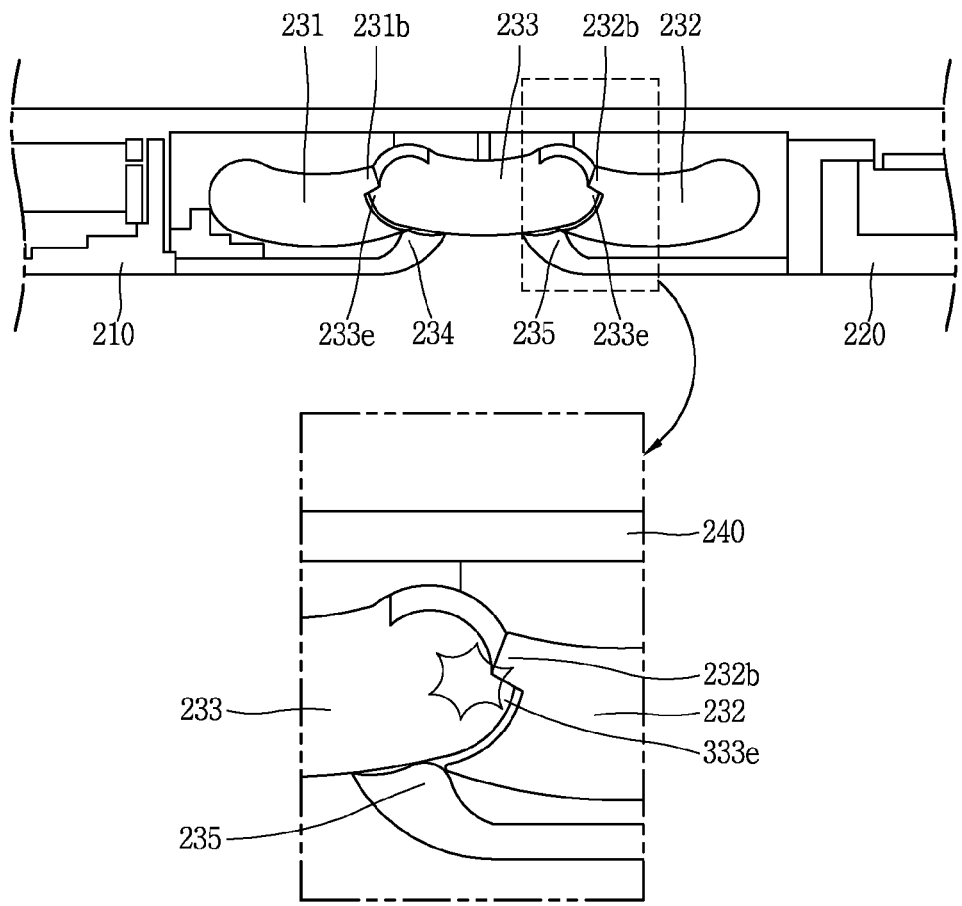
FIG. 10B is a partial enlarged view of FIG. 10A.
Figure 11A:
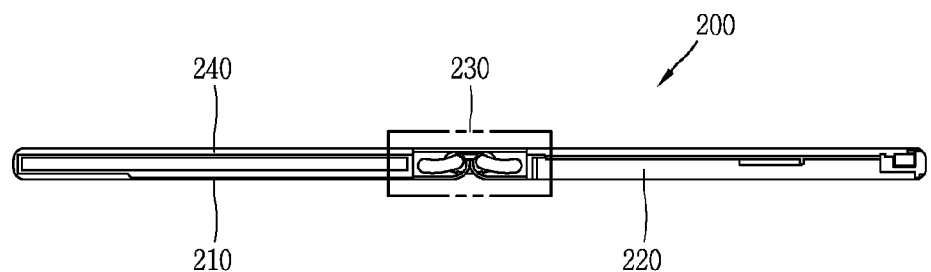
FIG. 11A is a sectional view taken along line H-H of FIG. 8.
Figure 11B:
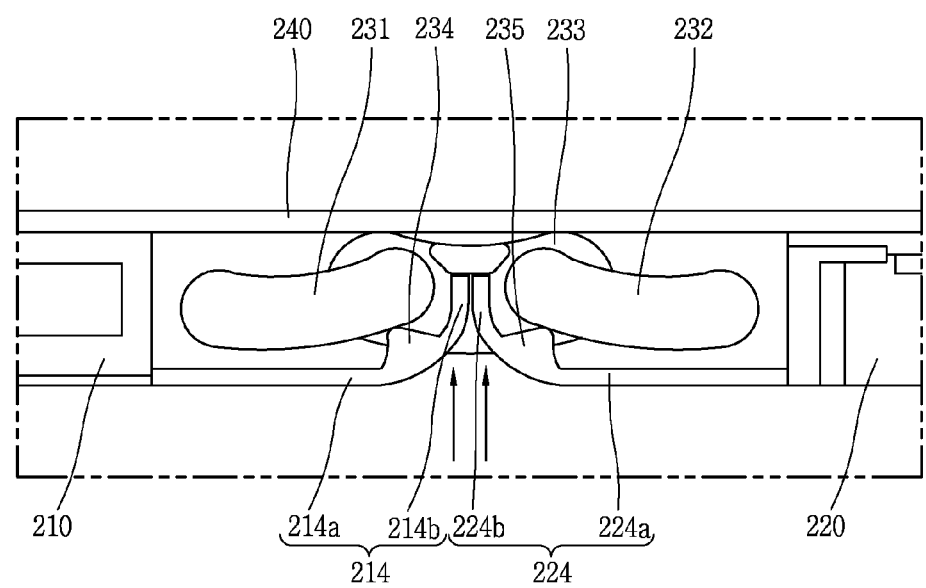
FIG. 11B is a partial enlarged view of FIG. 11A.

FIG. 8 is a plan view of FIG. 7B. FIG. 9A is a sectional view taken along line F-F of FIG. 8, and FIG. 9B is a partial enlarged view of FIG. 9A. FIG. 10A is a sectional view taken along line G-G of FIG. 8, and FIG. 10B is a partial enlarged view of FIG. 10A. FIG. 11A is a sectional view taken along line H-H of FIG. 8, and FIG. 11B is a partial enlarged view of FIG. 11A.

Referring to FIGS. 8 to 11, the rotating portion 233, more specifically the supporting portion 233d, and the first and second connecting portions 231 and 232 rotate while being contacted with each other or rotate while being almost contacted with each other. In this case, a means for preventing excessive rotations of the first and second connecting portions is required. To this end, according to an exemplary embodiment, the first and second connecting portions 231 and 232 rotate along the outer circumference of the supporting portion 233d, and a first projection 231b and a second projection 232b are formed at the first and second connecting portions 231 and 232, respectively. Also, latching portions 233e which allow the rotations of the first and second connecting portions 231 and 232 to be restricted by being contacted with the first and second projections 231b and 231b, respectively are formed at the outer circumference of the supporting portion 233d. As shown in FIGS. 4 to 6, the first and second connecting portions 231 and 232 have an approximately crescent moon shape, and the rotating portion 233 has a shape similar to a tumbling doll or number 8. The first and second connecting portions 231 and 232 rotate along the outer circumferential surface of the rotating portion 233. Since the first and second projections 231b and 232b are formed at the first and second connecting portions 231 and 232, respectively, the first and second projections 231b and 232b are respectively latched to the latching portions 233e formed at the outer circumference of the supporting portion 233d, to restrict excessive rotations of the first and second connecting portions 231 and 232.

In this case, the latching portions 233e are spaced apart from each other at both sides of the supporting portion 233d to respectively correspond to the first and second projections 231b and 232b. More specifically, the latching portions 233e are formed perpendicular to the disposition of the display 240 in the closed state. As such, the positions of the latching portions 233e are perpendicular to the display 240 in the closed state, so that the state of the mobile terminal 200 can be switched to the opened state as each of the first and second cases 210 and 220 rotates by 90 degrees.

Further, in an exemplary embodiment, a first protruding portion 234 and a second protruding portion 235 may be formed along the width directions at inner circumferential surfaces of the first and second cover portions 214 and 224 to restrict the rotations of the first and second connecting portions 231 and 232, respectively. That is, the rotations of the first and second connecting portions 231 and 232 are primarily restricted by couplings between the first and second projections 231b and 232b and the latching portions 233e, respectively, and excessive rotations of the first and second cover portions 214 and 224 are secondarily prevented by the first and second protruding portions 234 and 235, respectively. In addition, the first and second protruding portions 234 and 235 may function to lift the supporting portion 233d. That is, when the state of the mobile terminal 200 is switched from the closed state to the opened state, the position of the supporting portion 233d disposed below the display 240 may be changed upward to be contacted or non-contacted with the display 240. When the supporting portion 233d is contacted with the display 240, the supporting portion 233d can support the display (see FIGS. 9B, 10B, and 11B).

More specifically, the first and second cover portions 214 and 224 respectively include facing portions 214b and 224b facing each other in the opened state and spacing portions 214a and 224a spaced apart from each other in the opened state. In the opened state, the facing portions 214b and 224b may be spaced apart from each other at a predetermined distance D (see FIG. 13B).

Figure 12A:
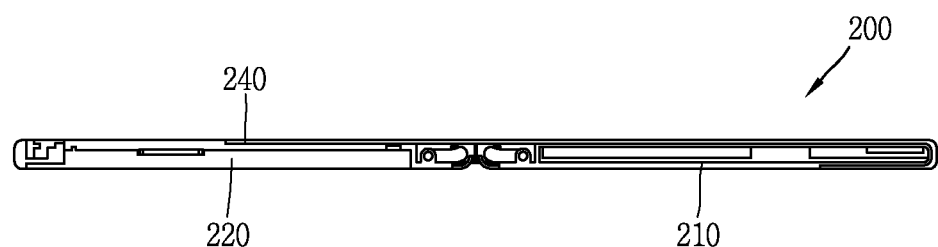
FIG. 12A is another sectional view taken along line H-H of FIG. 8.
Figure 12B:
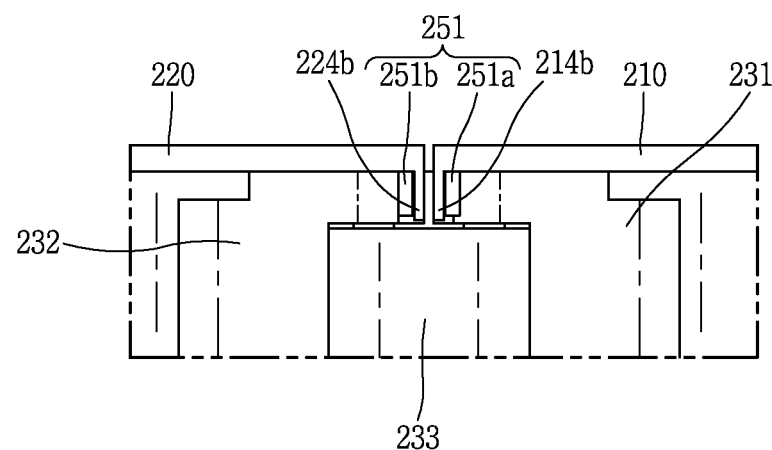
FIG. 12B is a partial plan view.
Figure 12C:
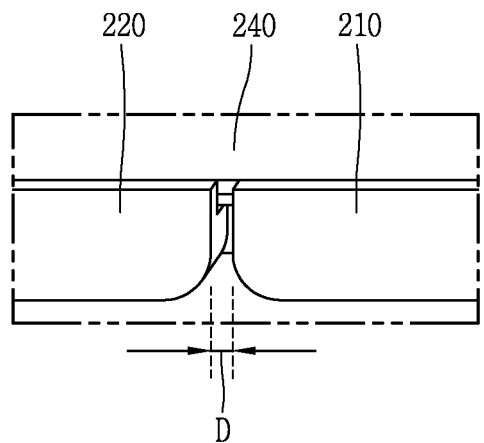
FIGS. 12C and 12D are partial perspective views of FIG. 12A.
Figure 12D:
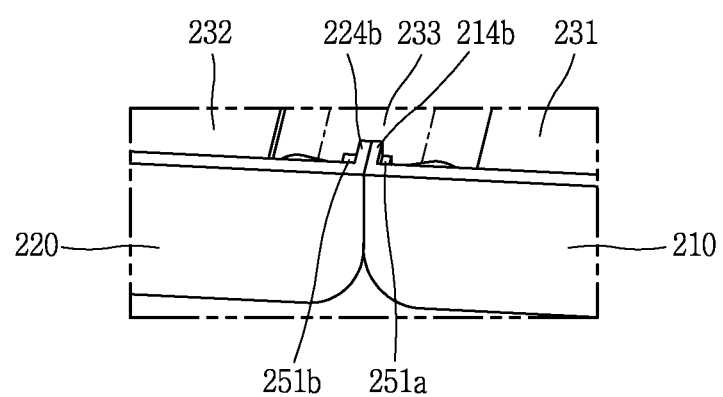

FIG. 12A is another sectional view taken along line H-H of FIG. 8, FIG. 12B is a partial plan view, and FIGS. 12C and 12D are partial perspective views of FIG. 12A. Referring to FIGS. 12A to 12D, magnetic members 251a and 251b (215) are provided to insides of the first and second cover portions 214 and 224 or the first and second wall portions 213 and 223, respectively, so that when the state of the first and second cases 210 and 220 is switched to the opened state, the first and second cover portions 214 and 224 can be adhered closely to each other.

That is, as described above, the supporting portion rises upward when the state of the mobile terminal 200 is switched from the closed state to the opened state. In this case, the first and second cover portions 214 and 224 may be spaced apart from each other at a predetermined distance D. In an exemplary embodiment, the magnetic members 251a and 251b (251) are applied so as to prevent the first and second cover portions 214 and 224 from being spaced apart from each other. In FIG. 12B, it is illustrated that the first and second magnetic members 251a and 251b are formed at the first and second cover portions 214 and 224, respectively. This will be described later.

Figure 13A:
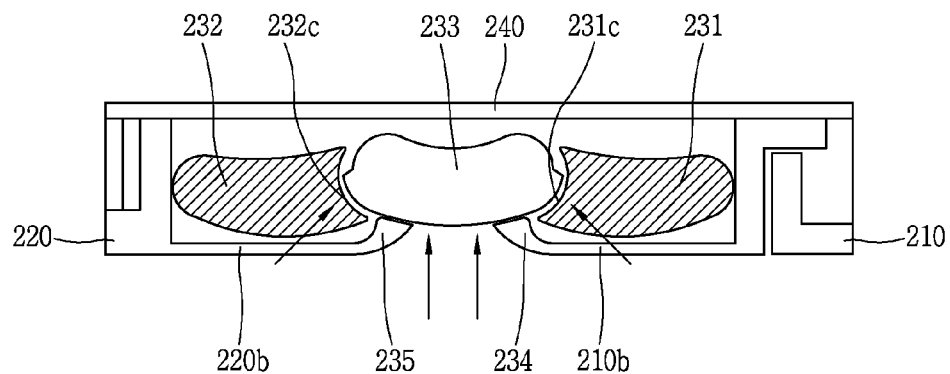
FIG. 13A is a sectional view including a coupling portion of the mobile terminal according to an exemplary embodiment.
Figure 13B:
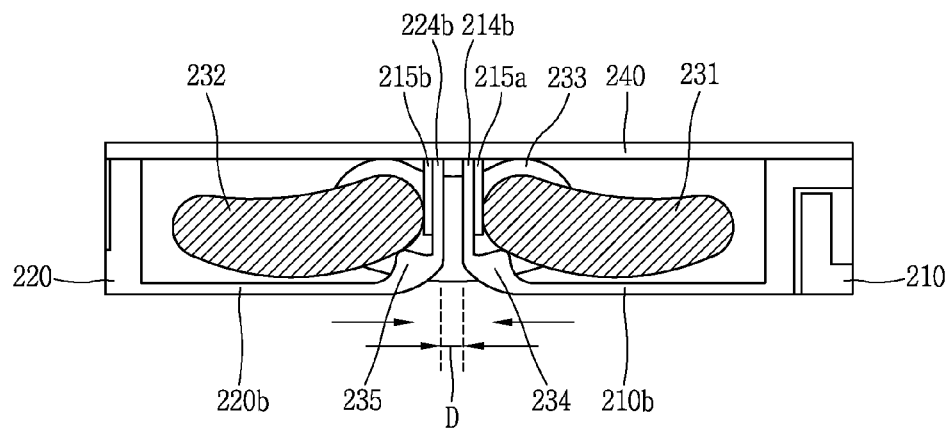
FIGS. 13B and 13C illustrate states before and after first and second cases are adhered closely to each other by magnetic members.
Figure 13C:
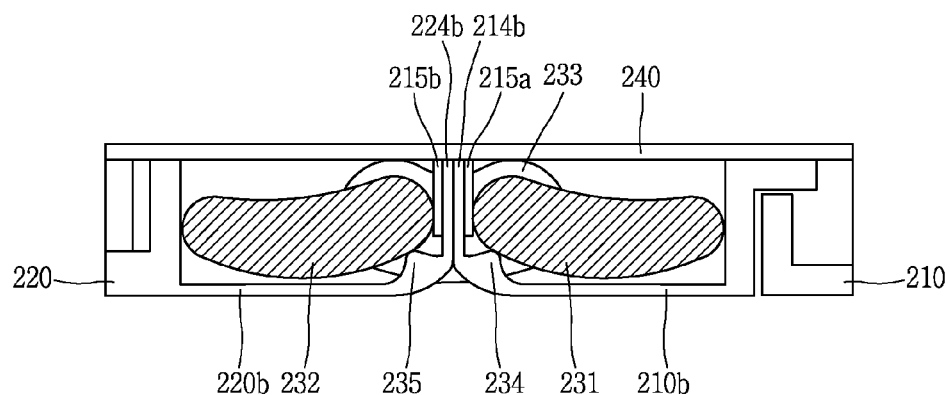

FIG. 13A is a sectional view including a coupling portion 230 of the mobile terminal according to an exemplary embodiment, and FIGS. 13B and 13C illustrate states before and after the first and second cases 210 and 220 are adhered closely to each other by the magnetic members 251a and 251b (251).

As shown in FIG. 13a, in the first and second connecting portions 231 and 232, circular arc portions 231c and 232c are formed adjacent to the outer circumference of the rotating portion 233. As the circular arc portions 231c and 232c are contacted with the outer circumference of the rotating portion 233, the first and second connecting portions 231 and 232 rotate. In this case, the rotating portion 233 is lifted upward by the first and second protruding portions 234 and 235 respectively formed at the first and second cases 210 and 220 and the circular arc portions 231c and 232c of the first and second cover portions 214 and 224. As such, as the rotating portion 233 is lifted upward, the rotating portion 233 is disposed while being contacted or almost contacted with the display 240, to support the display 240.

As shown in FIG. 13B, when the mobile terminal 200 is opened, the first and second facing portions 214b and 214b respectively formed inside the first and second bending portions 210b and 220b are spaced apart from each other as the first and second bending portions 210b and 220b rotate. Accordingly, the first and second cases 210 and 220 are spaced apart from each other at the predetermined distance D. In this case, if the first and second cases 210 and 220 are spaced apart from each other when a user uses the mobile terminal 200, inconvenience may be caused in the use of the mobile terminal 200. Therefore, the first and second cases 210 and 220 are preferably contacted with each other. To this end, in the exemplary embodiment, the magnetic member 251 is provided at one sides of the first and second facing portions 214b and 224b. The magnetic member 251 is formed inside the first and second cases 210 and 220, so that the first and second cases 210 and 220 are not spaced apart from each other after being relatively rotated to each other.

In the exemplary embodiment, the first and second protruding portions 234 and 235 are formed at the inner circumferential surfaces of the first and second cover portions 214 and 224, to prevent excessive rotations of the first and second connecting portions 231 and 232, respectively. The exemplary embodiment can be applied to other exemplary embodiments as long as it is not particularly limited.

Figure 14A:
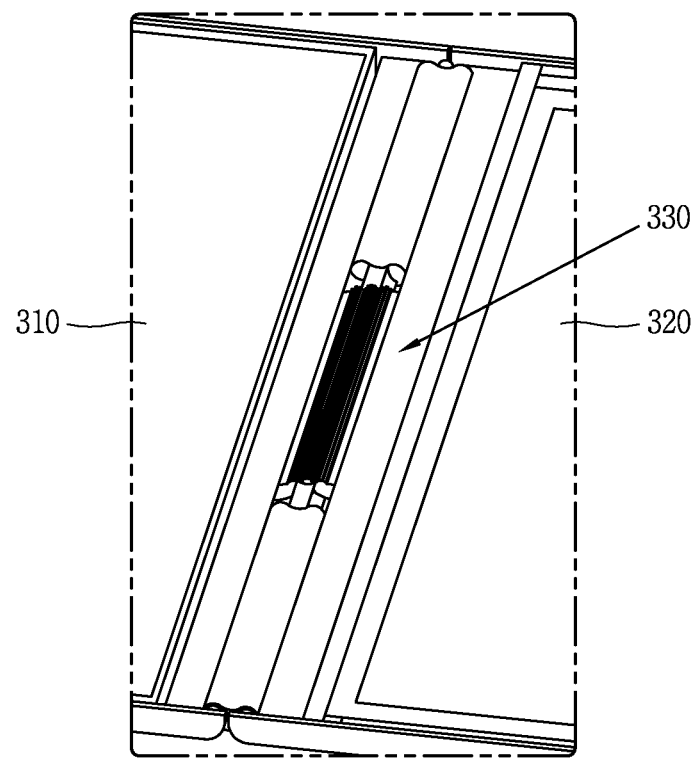
FIG. 14A is a partial perspective view of a mobile terminal in which a coupling portion is formed according to an exemplary embodiment.
Figure 14B:
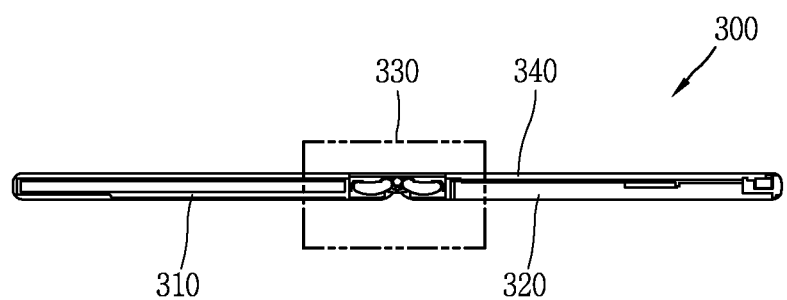
FIG. 14B is a sectional view of the mobile terminal provided with the coupling portion having a gear structure.
Figure 14C:
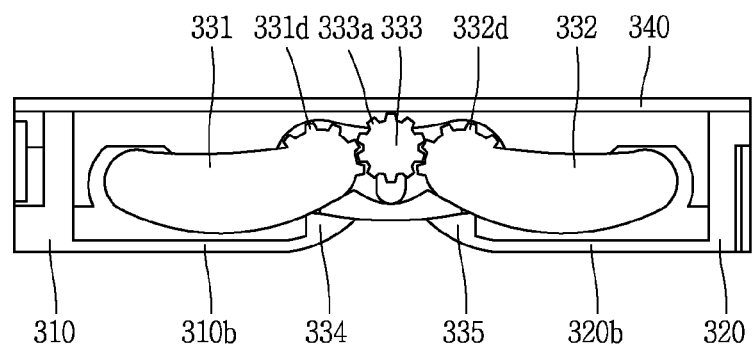
FIG. 14C is a partial sectional view of FIG. 14B.
Figure 14D:
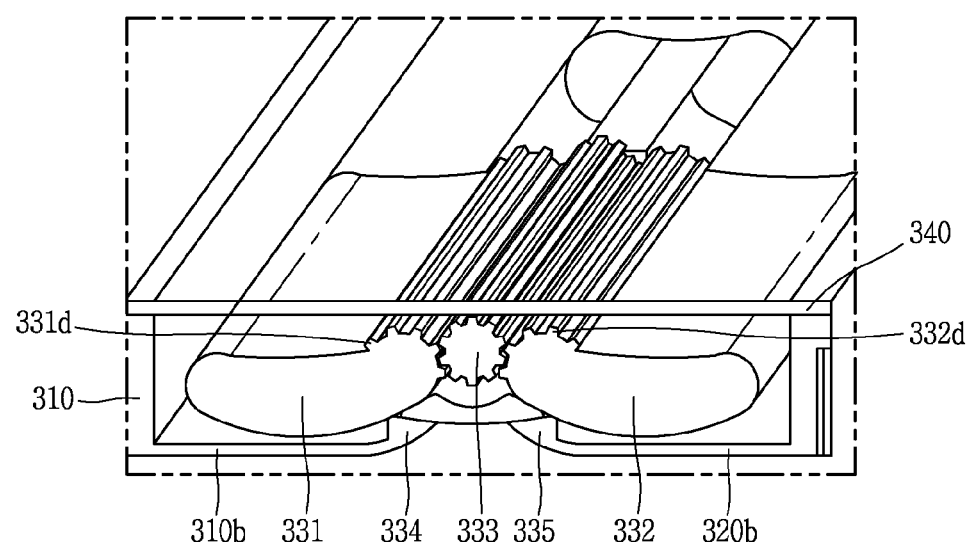
FIG. 14D is a partial perspective view of FIG. 14B.

In an exemplary embodiment, first and second connecting portions 310 and 320 may be rotated by gear coupling of a coupling portion 30. FIG. 14A is a partial perspective view of a mobile terminal 300 in which a coupling portion 330 is formed according to an exemplary embodiment, FIG. 14B is a sectional view of the mobile terminal 300 provided with the coupling portion 330 having a gear structure, FIG. 14C is a partial sectional view of FIG. 14B, and FIG. 14D is a partial perspective view of FIG. 14B. Referring to FIGS. 14A to 14D, a gear 333a is formed at the outer circumference of the rotating portion 333, and a first gear 331d and a second gear 332d, corresponding to the gear 333a of the rotating portion 333, are respectively formed at portions of the first and second connecting portions 331 and 332, which are coupled to the rotating portion 233, to be gear-coupled to the rotating portion 333.

The first and second gears 331d and 332d are gears formed at portions of the outer circumferences of the first and second connecting portions 331 and 332, respectively. The gear 333a is formed at the outer circumference of the rotating portion 333 and gear-coupled to the first and second gears 331d and 332d. However, the rotating portion 333 does not rotate and merely vertically moves. That is, the rotating portion 333 is lifted by the gear coupling of the first and second gears 331d and 332d to the gear 333a formed at the rotating portion 333, so that the rotating portion 333 can support a display 340.

The coupling portion 330 shown in FIG. 14 may be formed at a middle portion in the width direction of the mobile terminal 300, and may be formed together with the coupling portion 230 described above. That is, the coupling portion 230 shown in FIG. 6 may be formed at the upper and lower ends of the mobile terminal 200, and simultaneously, the coupling portion 330 shown in FIG. 14 may be formed at the middle portion of the mobile terminal 300. This is identically applied to the following case, and therefore, a plurality of coupling portions may be simultaneously used as long as it is not particularly limited.

In another exemplary embodiment, as shown in FIGS. 15 and 16, there may be provided a structure in which a first connecting portion 431 and a second connecting portion 432 are integrally formed.

Figure 15A:
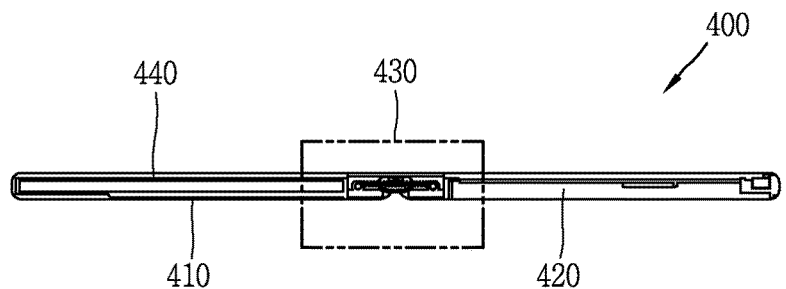
FIG. 15A is a sectional view of a mobile terminal according to an exemplary embodiment.
Figure 15B:
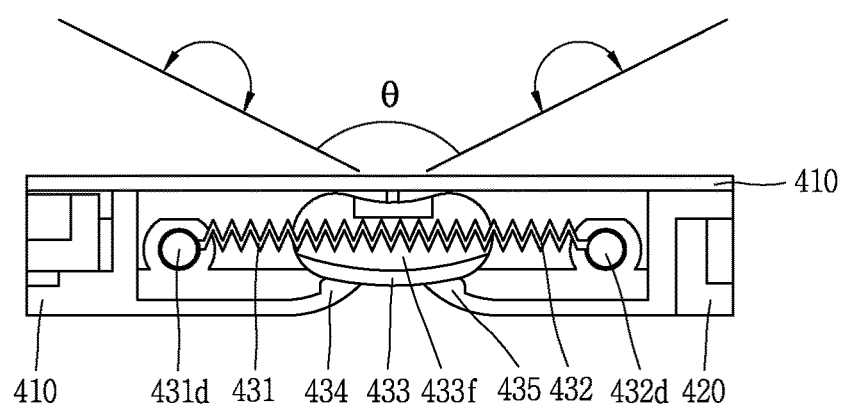
FIG. 15B is a partial enlarged view of FIG. 15A.
Figure 15C:
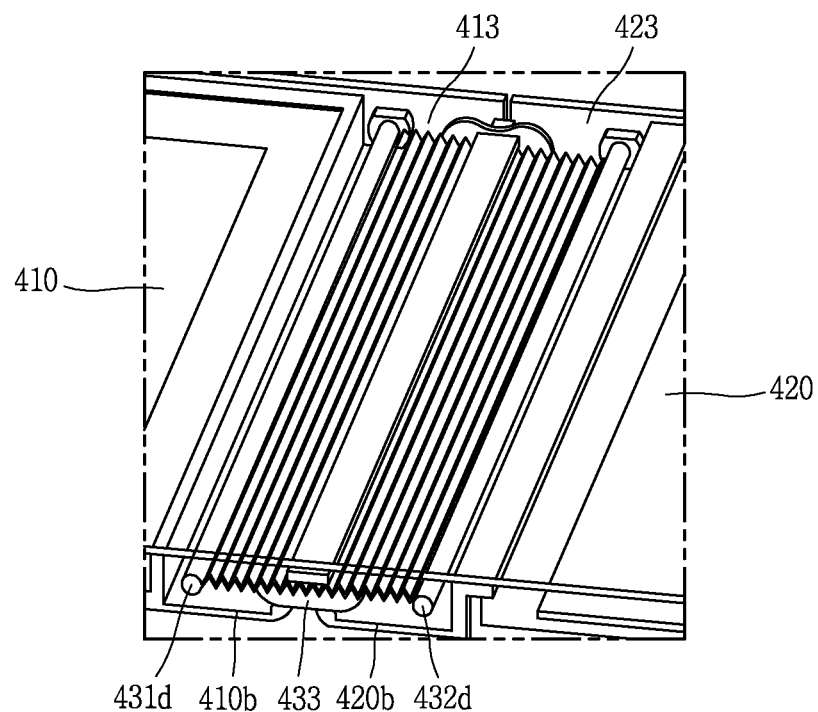
FIG. 15C is a perspective view of FIG. 15B.
Figure 15D:
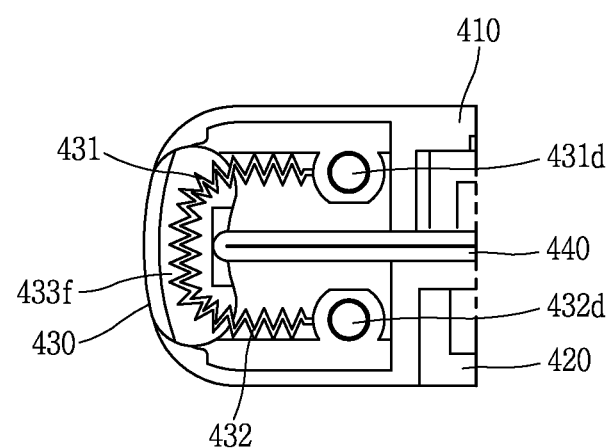
FIG. 15D is a partial sectional view of the mobile terminal in a closed state.
Figure 16A:
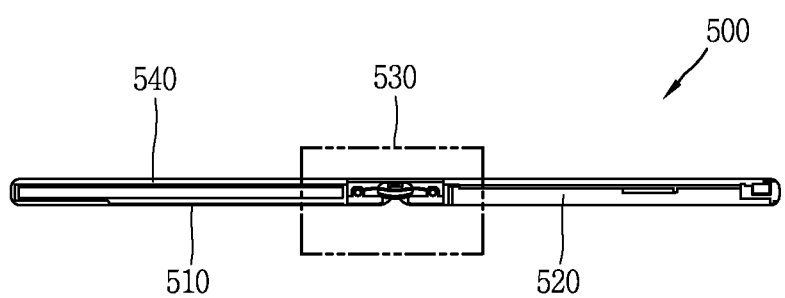
FIG. 16A is a sectional view of a mobile terminal according to an exemplary embodiment.
Figure 16B:
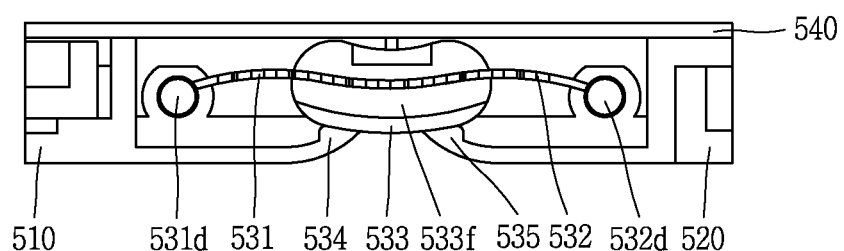
FIG. 16B is a partial enlarged view of FIG. 16A.
Figure 16C:
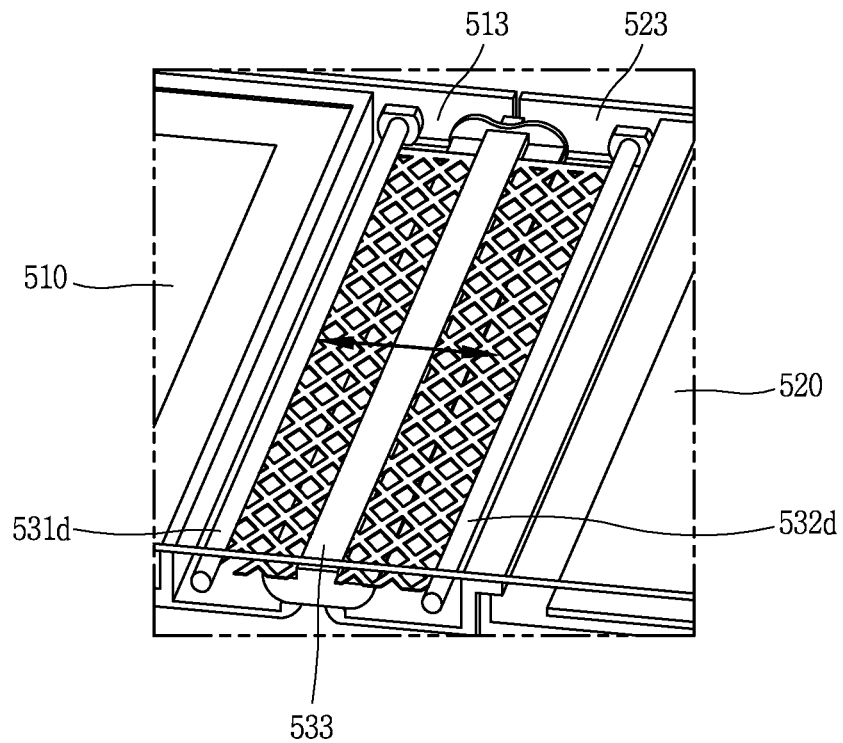
FIG. 16C is a perspective view of FIG. 16B.
Figure 16D:
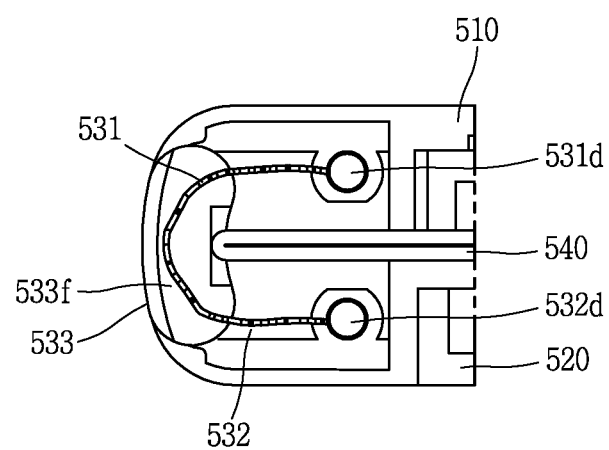
FIG. 16D is a partial sectional view of the mobile terminal in a closed state.

FIG. 15A is a sectional view of a mobile terminal 400 according to an exemplary embodiment, FIG. 15B is a partial enlarged view of FIG. 15A, FIG. 15C is a perspective view of FIG. 15B, and FIG. 15D is a partial sectional view of the mobile terminal 400 in a closed state. Similarly, FIG. 16A is a sectional view of a mobile terminal 500 according to an exemplary embodiment, FIG. 16B is a partial enlarged view of FIG. 16A, FIG. 16C is a perspective view of FIG. 16B, and FIG. 16D is a partial sectional view of the mobile terminal 500 in a closed state.

Referring to FIGS. 15 and 16, hollow portions 433f and 533f are formed inside rotating portions 433 and 533, respectively, and first connecting portions 431 and 531 and second connecting portions 432 and 532 pass through the hollow portions 433f and 533f, respectively. The first connecting portions 431 and 531 and the second connecting portions 432 and 532 are integrally formed and are flexible. First supporting shafts 431d and 531d and second supporting shafts 432d and 532d, which fix the first connecting portions 431 and 531 and the second connecting portions 432 and 532, are formed at both ends of the first connecting portions 431 and 531 and the second connecting portions 432 and 532, respectively.

In FIGS. 15 and 16, the first connecting portions 431 and 531 and the second connecting portions 432 and 532 are integrally formed, and employ a flexible structure. In order to implement the flexible structure, a corrugated plate having a plurality of corrugations or a mesh may be used as the first connecting portions 431 and 531 and the second connecting portions 432 and 532. The corrugated plate or the mesh is made of a flexible material such as the first supporting shafts 431d and 531d and the second supporting shafts 432d and 532d can laterally move. However, the first connecting portions 431 and 531 and the second connecting portions 432 and 532 are members expanded or contracted according to the shape of a mechanism.

The first supporting shafts 431d and 531d and the second supporting shafts 432d and 532d are fixed to first wall portions 413 and 513 and second wall portions 423 and 523 of first cases 410 and 510 and second cases 420 and 520, respectively. In the state in which the mobile terminals 400 and 500 are opened, the first connecting portions 431 and 531 and the second connecting portions 432 and 532 are located at the hollow portions 433*f* and 533*f*, respectively. However, in the state in which the mobile terminals 400 and 500 are closed, the first connecting portions 431 and 531 and the second connecting portions 432 and 532 are expanded. Thus, the first connecting portions 431 and 531 and the second connecting portions 432 and 532 can be contacted with inner walls of the hollow portions 433*f* and 533*f*, respectively.

When a flexible member is used as described above, the corrugated plate or the mesh may be formed throughout a portion or the entire portion of the width direction of the mobile terminal 400 or 500.

Figure 17A:
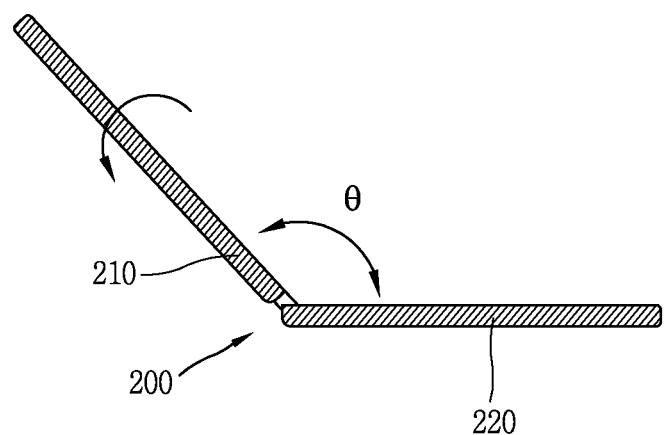
FIG. 17A is a view illustrating a folded state of the mobile terminal by a click hinge according to an exemplary embodiment.
Figure 17B:
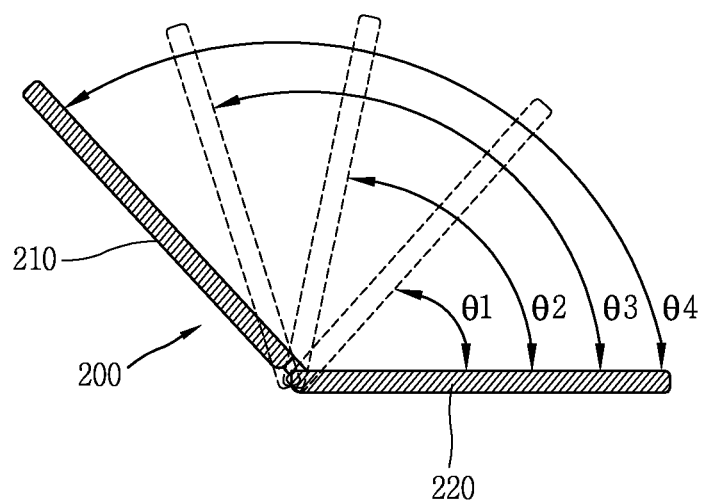
FIG. 17B is a view illustrating a free-stop hinge.

FIG. 17A is a view illustrating a folded state of the mobile terminal by a click hinge according to an exemplary embodiment, and FIG. 17B is a view illustrating a free-stop hinge.

The click hinge is used to implement a structure in which the mobile terminal is automatically opened or closed at a specific angle θ or more. The free-stop hinge is used to implement a structure in which a user can open the mobile terminal to a desired angle. For example, as shown in FIG. 17B, the user can open or close the mobile terminal to various angles θ1, θ2, θ3, and θ4. As shown in FIG. 17, the mobile terminal 200 can be normally used even in a folded state.

Figure 18A:
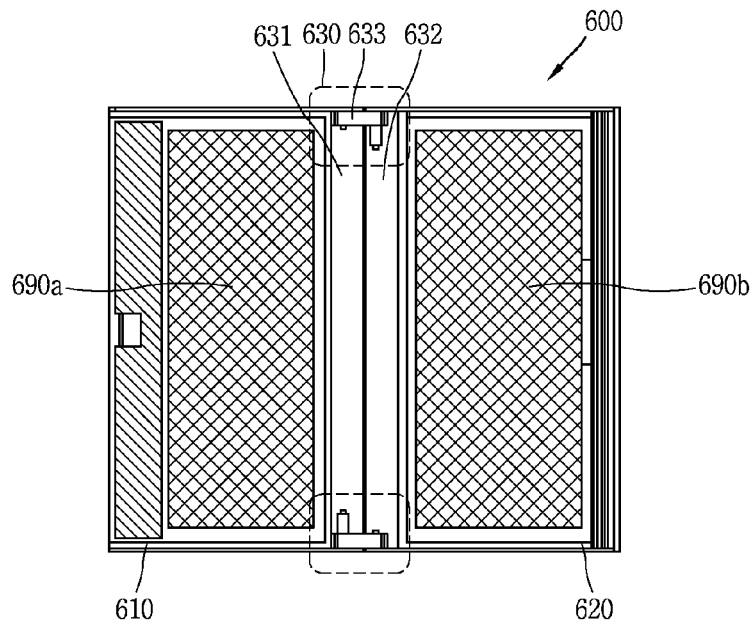
FIG. 18A is a plan view of a mobile terminal in a state in which a display is removed according to an exemplary embodiment.
Figure 18B:
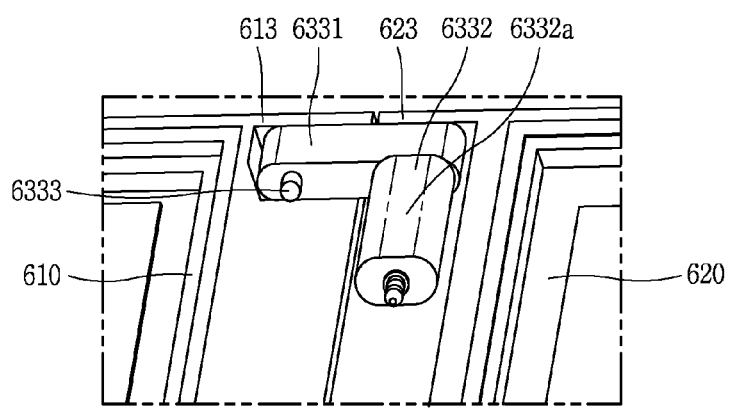
FIG. 18B is a perspective view of a coupling portion having a single hinge of FIG. 18A.
Figure 18C:
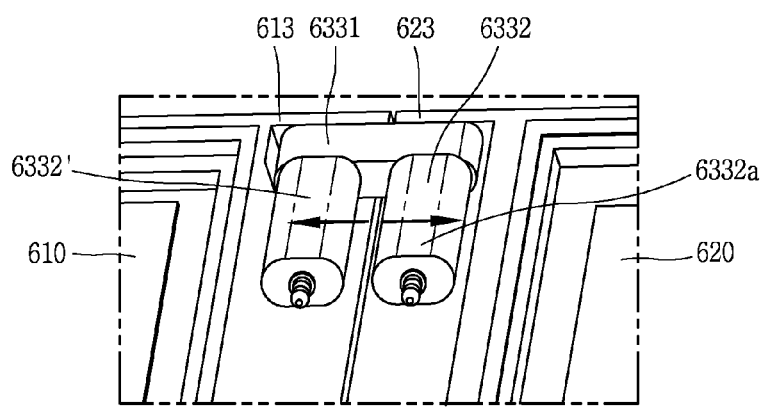
FIG. 18C is a perspective view of the coupling portion having a dual hinge.

FIG. 18A is a plan view of a mobile terminal 600 in a state in which a display is removed according to an exemplary embodiment, FIG. 18B is a perspective view of a coupling portion 630 having a single hinge of FIG. 18A, and FIG. 18C is a perspective view of the coupling portion 630 having a dual hinge.

Referring to FIG. 18, each rotating portion 633 may be a click hinge which includes a housing 6331 fixed to a first wall portion 613 and a second wall portion 623, and a cam portion 6332 protruding from one side of the housing 6331 to be inserted into a first connecting portion 631 or a second connecting portion 632, the camp portion 6332 rotating the first connecting portion 631 or the second connecting portion 632. The click hinges may be disposed at upper and lower ends of the coupling portion 630, respectively, and one or two cam portions may be used for the rotating portion. When one camp portion 6332 is used, the click hinge is referred to as a single hinge. When two cam portions 6332 and 6332' are used, the click hinge is referred to as a dual hinge.

In the case of the single hinge, the cam portions 6332 are diagonally located at the upper and lower ends of the coupling portion 630, and a projection 6333 is formed at the other side of the housing 6331 to be inserted into the first connecting portion 631 or the second connecting portion 632 exclusively from the cam portion 6332. That is, as shown in FIG. 18A, if the cam portion 6332 in the click hinge located at the upper end of the coupling portion 630 rotates a second case 620, the cam portion 6332 of the click hinge located at the lower end of the coupling portion 630 is disposed to rotate a first case 610. A flat portion 6332*a* formed with a flat surface may be formed at a portion of the outer circumferential surface of the cam portion 6332 such that the cam portion 6332 can rotate the first case 610 or the second case 620.

In this figure, it is illustrated that the click hinges are disposed at the upper and lower ends of the mobile terminal 600, respectively. However, the click hinge may be disposed at only the upper or lower end. It will be apparent that the cam portions 6332 are not necessarily located in the diagonal direction and may be disposed on the same line even when the camp portions 6332 are disposed at the upper and lower ends, respectively.

The click hinge is obvious to those skilled in the art, and therefore, the detailed description of the configuration of the click hinge will be omitted.

Figure 19A:
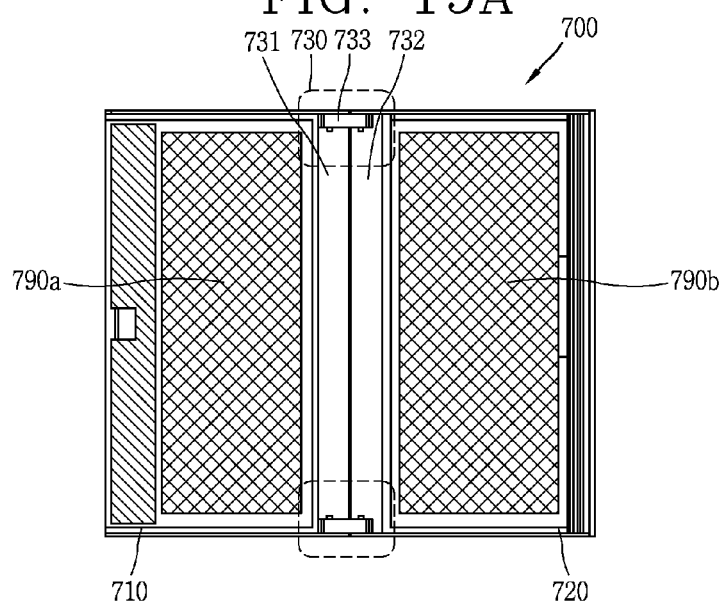
FIG. 19A is a plan view of a mobile terminal from which a display is removed according to an exemplary embodiment.
Figure 19B:
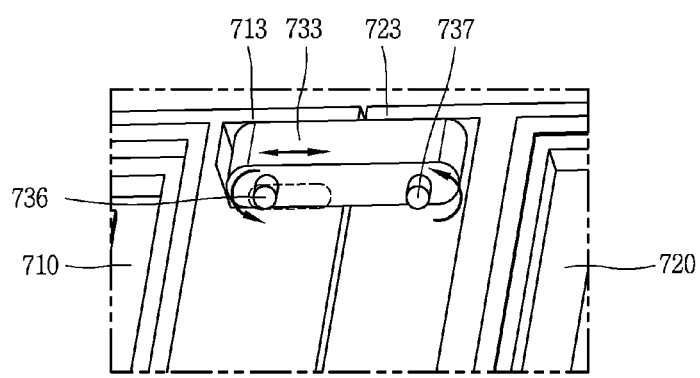
FIG. 19B is a partial perspective view including a rotating portion in FIG. 19A.
Figure 19C:
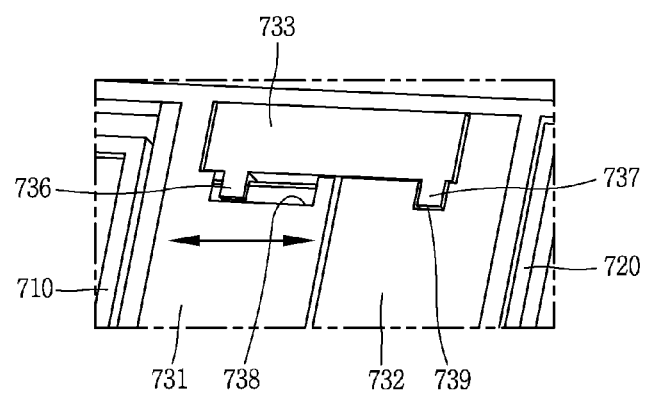
FIG. 19C is a cut-away sectional view of FIG. 19B.

FIG. 19A is a plan view of a mobile terminal 700 from which a display is removed according to an exemplary embodiment, FIG. 19B is a partial perspective view including a rotating portion 733 in FIG. 19A, and FIG. 19C is a cut-away sectional view of FIG. 19B.

Referring to FIG. 19, the rotating portion 733 may be a housing including a first joint 736 and a second joint 737, respectively inserted into a first connecting portion 731 and a second connecting portion 732. Any one of the first and second joints 736 and 737 may be configured to move in a long hole 738 formed in the first connecting portion 731 or the second connecting portion 732. In this case, the rotating portion 733 may be attached to a first wall portion 713 or a second wall portion 723. Here, the second joint 737 is formed in a joint insertion hole 739.

The rotating portion 733 is inserted and fixed into the first and second connecting portions 731 and 732. As shown in FIGS. 19B and 19C, the rotating portion 733 rotates about the second joint 737 formed in a second case 720, and the first joint 736 laterally moves in the long hole 738 formed in the first connecting portion 731. That is, the first joint 736 rotates using the second joint 737 as a center shaft. In this case, as the first joint 736 laterally moves inside the long hole 738, it is possible to implement a state in which the first and second connecting portions 731 and 732 are opened or closed. When the state of the mobile terminal 700 is switched to the opened or closed state, the first joint 736 rotates while laterally sliding in the long hole 738, and as a result, a first case 710 rotates. The rotating portions 733 are disposed at upper and lower ends of the mobile terminal 700, respectively, and the first and second cases 710 and 720 can be rotated without latching with each other by the rotation and sliding of the first joint 736. In this figure, it is illustrated that the long hole 738 is formed in the first connecting portion 731. However, the present disclosure is not limited thereto, and the first joint 736 may move inside the rotating portion 733.

According to the structure described above, the mobile terminal 700 can be opened/closed without any click hinge.

Figure 20A:
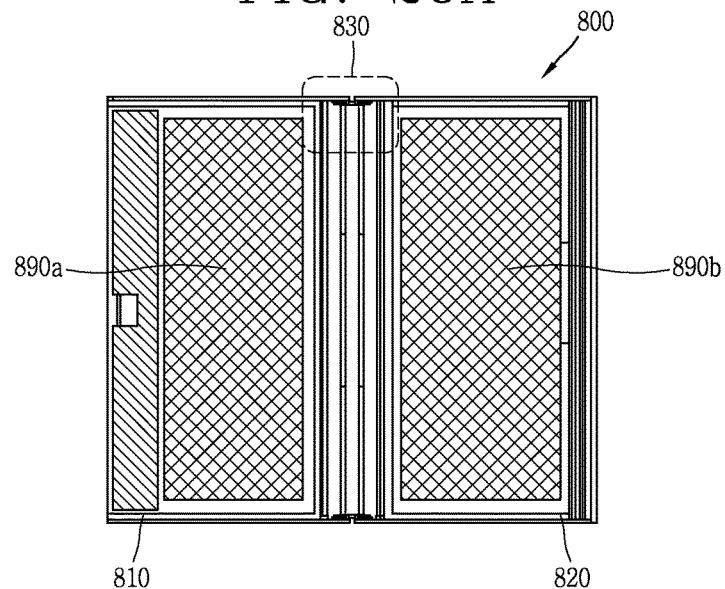
FIG. 20A is a plan view of a mobile terminal from which a display is removed according to an exemplary embodiment.
Figure 20B:
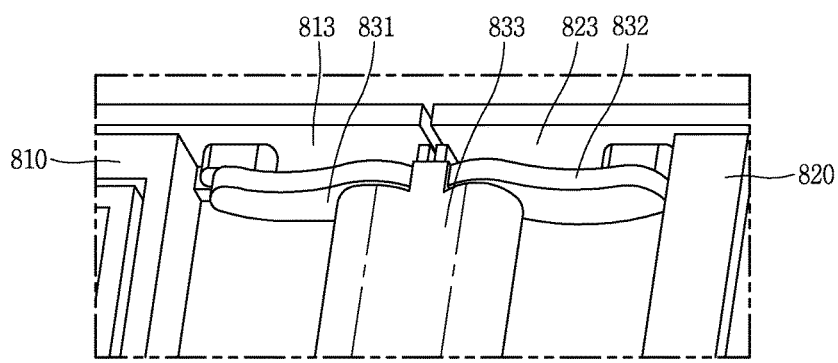
FIG. 20B is a partial perspective view including a coupling portion in the mobile terminal.
Figure 20C:
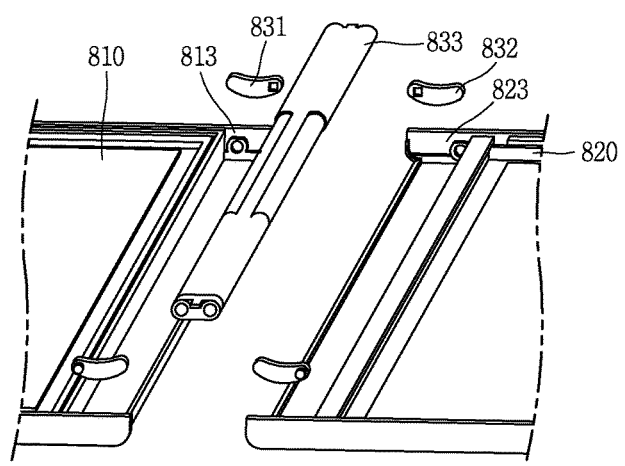
FIG. 20C is an exploded perspective view of FIG. 20B.
Figure 21A:
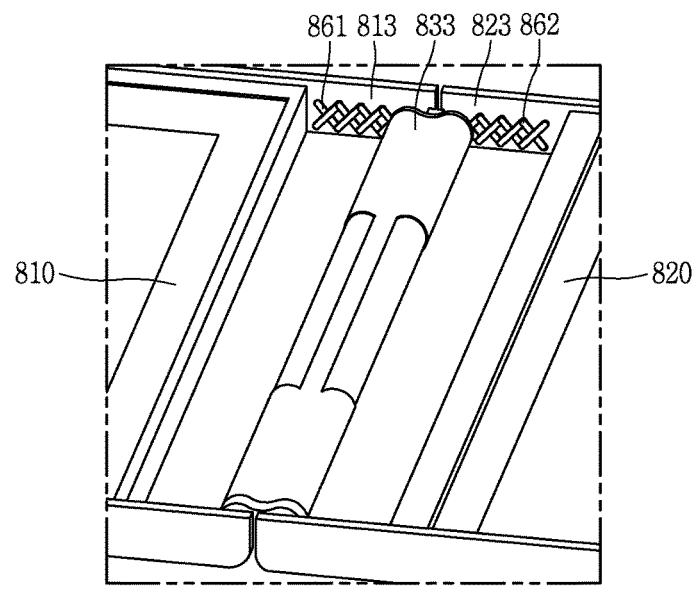
FIG. 21A is a partial perspective view of the mobile terminal according to an exemplary embodiment.
Figure 21B:
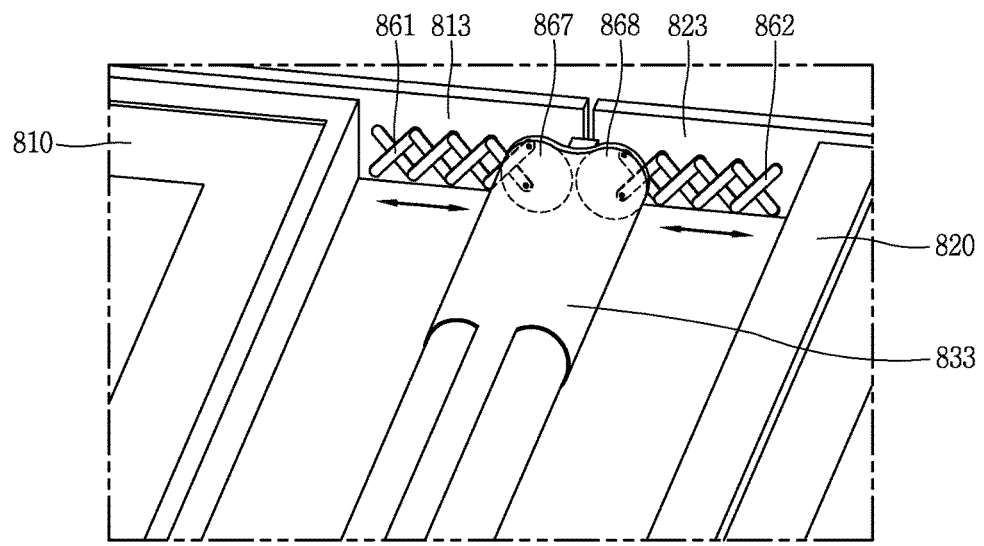
FIG. 21B is a partial enlarged view of FIG. 21A.

FIG. 20A is a plan view of a mobile terminal 800 from which a display is removed according to an exemplary embodiment, FIG. 20B is a partial perspective view including a coupling portion 830 in the mobile terminal 800, and FIG. 20C is an exploded perspective view of FIG. 20B. FIG. 21A is a partial perspective view of the mobile terminal 800 according to the exemplary embodiment, and FIG. 21B is a partial enlarged view of FIG. 21A.

Referring to FIGS. 20 and 21, one end portions of a first connecting portion 831 and a second connecting portion 832 are fixed to a first wall portion 813 and a second wall portion 823, respectively, and the other end portions of the first and second connecting portions 831 and 832 are fixed to a rotating portion 833. Each of the first and second connecting portions 831 and 832 may be a link or a zigzag spring. FIG. 20 illustrates that each of the first and second connecting portions 831 and 832 is a link. FIG. 21 illustrates that each of the first and second connecting portions 831 and 832 is a zigzag spring. Referring to FIGS. 20A to 20C, the mobile terminal 800 according to the exemplary embodiment has a structure in which the first and second connecting portions 831 and 832 as links can rotate about the rotating portion 833. In this case, the coupling portion 830 may be one at which a gear is formed as described in FIG. 14. This is the same in FIG. 21.

As shown in FIG. 21, when each of the first and second connecting portions 831 and 832 is a zigzag spring, the other ends of the first and second connecting portions 831 and 832 are coupled to the rotating portion 833. The other ends of the first and second connecting portions 831 and 832 are respectively fixed to a first rotating plate 867 and a second rotating plate 868, which are formed at an end of the rotating portion 833 and rotatable independently from the rotating portion 833. The zigzag spring includes a first zigzag spring 861, and a second zigzag spring, which are respectively provided to a first case 810 and a second case 820. The zigzag springs 861 and 862 expand/contract as the first and second cases 810 and 820 rotate. When the state of the mobile terminal 800 is switched to the opened state, the first and second zigzag springs 861 and 862 expand. When the state of the mobile terminal 800 is switched to the closed state, the first and second zigzag springs 861 and 862 contract.

As such, the first and second zigzag springs 861 and 862 are respectively fixed to the first and second rotating plates 867 and 868 such that the rotations of the first and second zigzag springs 861 and 862 are possible, and the first and second rotating plates 867 and 868 are rotatably coupled to the rotating portion 833.

Figure 22A:
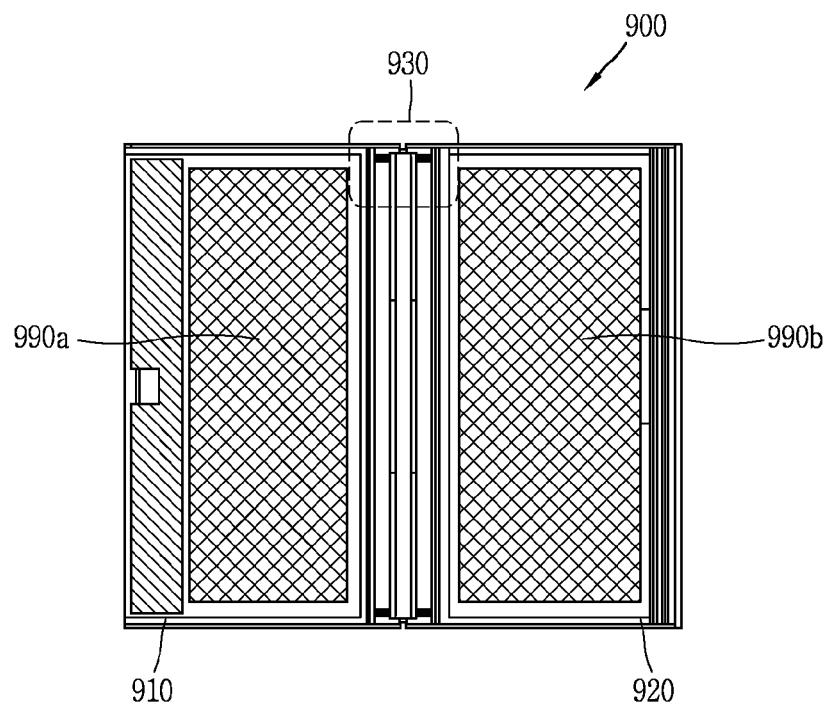
FIG. 22A is a plan view of a mobile terminal from which a display is removed according to an exemplary embodiment.
Figure 22B:
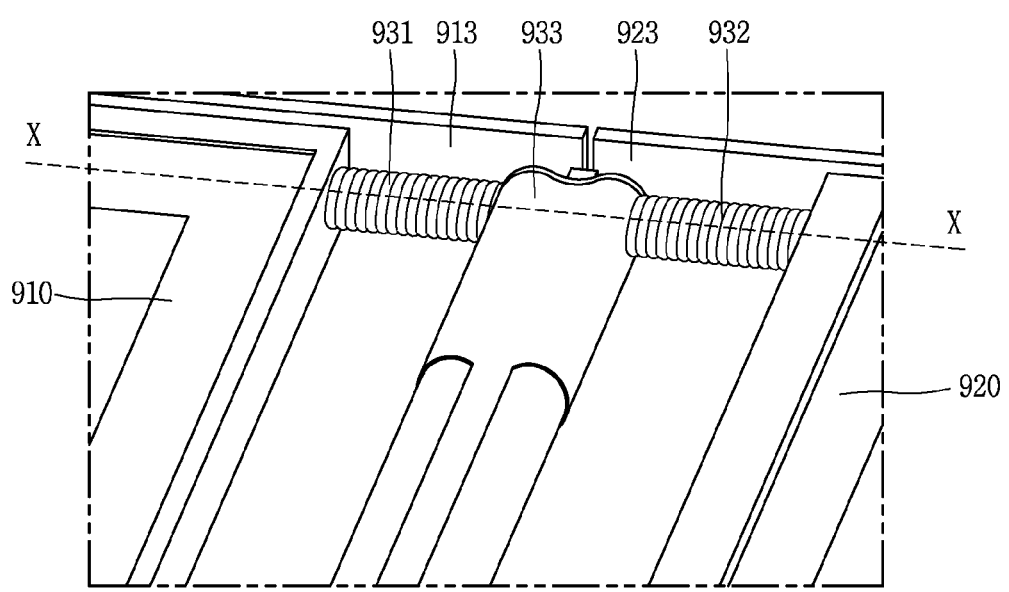
FIG. 22B is a partial perspective view including a coupling portion in the mobile terminal of FIG. 22A.
Figure 22C:
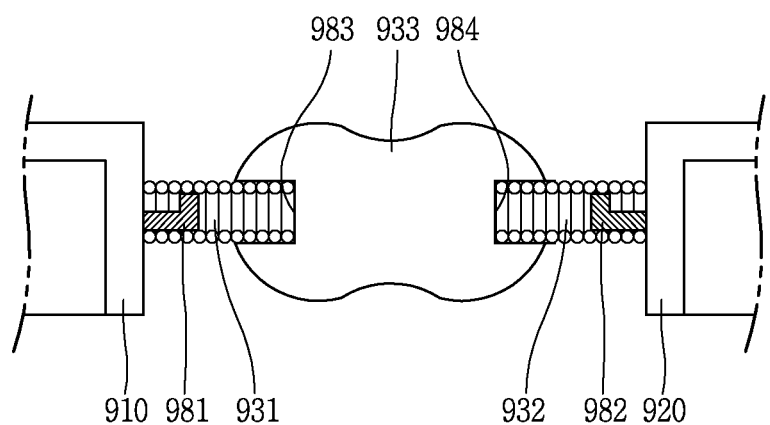
FIG. 22C is a sectional view taken along line X-X of FIG. 22B.

FIG. 22A is a plan view of a mobile terminal 900 from which a display is removed according to an exemplary embodiment, FIG. 22B is a partial perspective view including a coupling portion 930 in the mobile terminal 900 of FIG. 22A, and FIG. 22C is a sectional view taken along line X-X of FIG. 22B.

Referring to FIG. 22, a first connecting portion 931 and a second connecting portion 932 are fixed to a first hook 981 and a second hook 982, formed at a first case 910 and a second case 920, respectively. The other end portions of the first and second connecting portions 931 and 932 are respectively mounted in a first accommodating portion 983 and a second accommodating portion 984, which are recessed in a rotating portion 933. A first coil spring 931 and a second coil spring 932 may be used as examples of the first and second connecting portions 931 and 932, respectively.

In FIG. 22, the first and second connecting portions 931 and 932 are coil springs, and a restoring store generated when the first and second connecting portions 931 and 932 rotate with respect to each other is used.

The first and second hooks 981 and 982 have an 'L' shape, and the first and second accommodating portions 983 and 984 are provided with spaces into which one end portions of the first and second coil springs 931 and 932 as the first and second connecting portions 931 and 932 are inserted and fixed.

That is, as shown in FIG. 22C, in the state in which the mobile terminal 900 is opened, the first and second coil springs 931 and 932 respectively accommodated in the first and second accommodating portions 983 and 984 of the rotating portion 933 maintain a horizontal state. However, in the state in which the mobile terminal 900 is closed, the first and second cases 910 and 920 rotate while the first and second coil springs 931 and 932 are curved. Thus, the first and second coil springs 931 and 932 are opposite to each other. In this case, the first and second coil springs 931 and 932 have a form similar to those in FIGS. 15D and 16D.

Figure 23A:
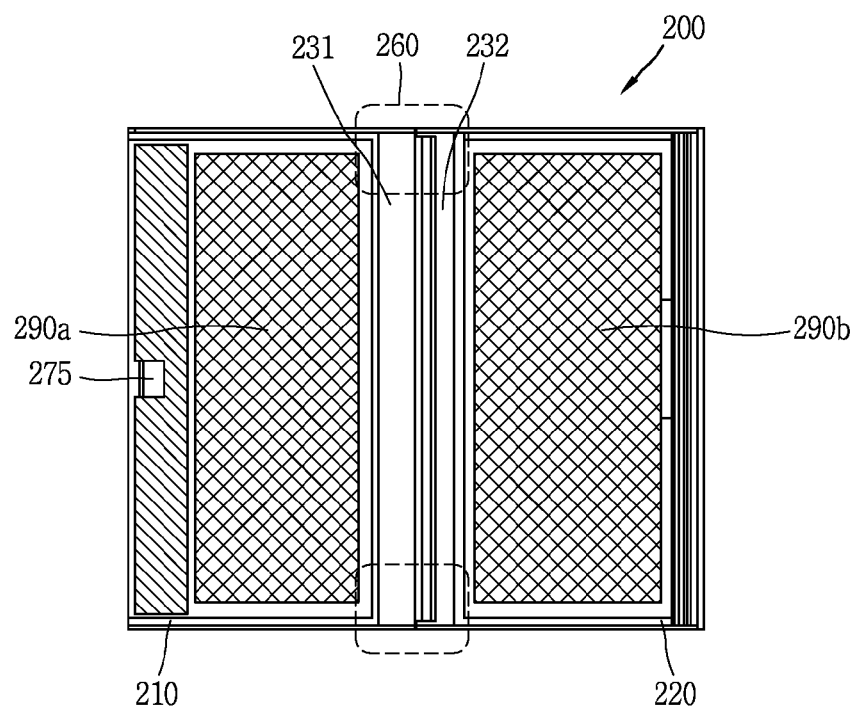
FIG. 23A is a plan view of the mobile terminal from which the display is removed according to an exemplary embodiment.
Figure 23B:
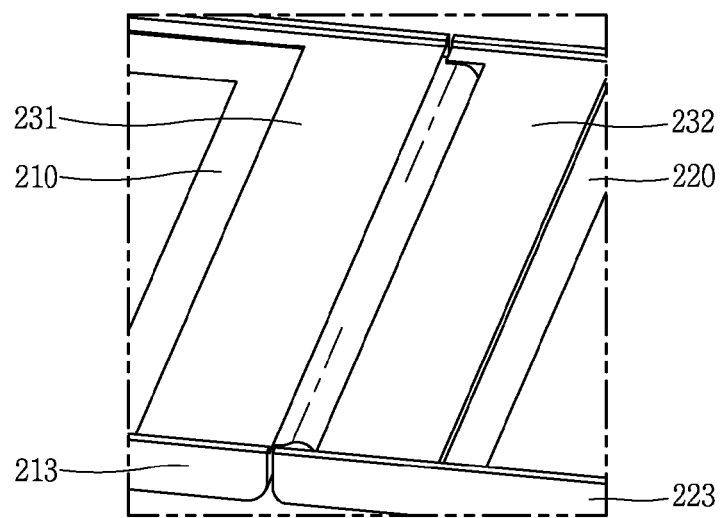
FIG. 23B is a perspective view illustrating a state in which the first and second connecting portions are coupled to each other.
Figure 23C:
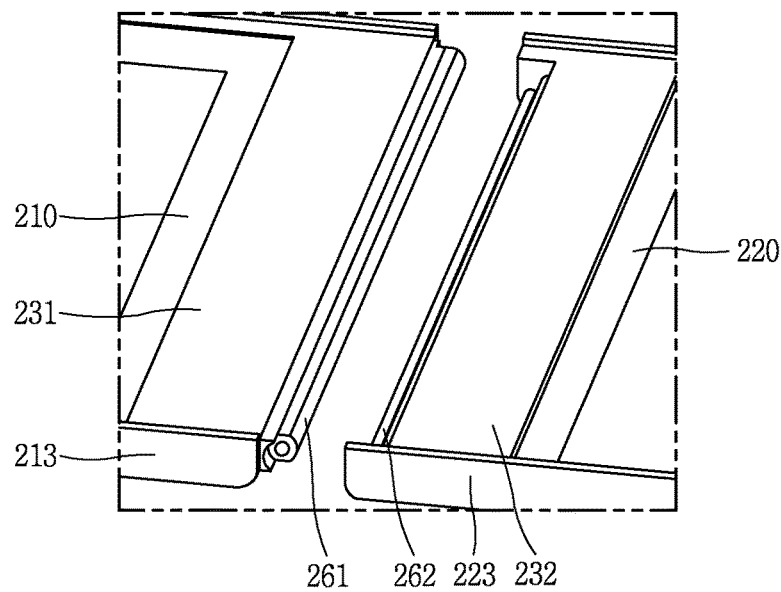
FIG. 23C is a perspective view illustrating a state in which the first and second connecting portions are separated from each other.

FIG. 23A is a plan view of the mobile terminal 200 from which the display is removed according to an exemplary embodiment, FIG. 23B is a perspective view illustrating a state in which the first and second connecting portions 231 and 232 are coupled to each other, and FIG. 23C is a perspective view illustrating a state in which the first and second connecting portions 231 and 232 are separated from each other. According to the exemplary embodiment, the rotating portion 233 includes a cylinder portion 261 formed at an end of the first connecting portion 231, the cylinder portion 261 having a hole formed therein, and a hinge shaft 262 formed at an end of the second connecting portion 232, the hinge shaft 262 being inserted into the hole such that the first and second cases 210 and 220 are rotatable. That is, in FIG. 23, the mobile terminal 200 can be opened/closed by a coupling structure of the first and second cases 210 and 220 without any hinge.

In this case, the first and second connecting portions 231 and 232 may be formed to respectively extend from ends of the first and second cases 210 and 220 and be parallel to each other toward the front surface.

Figure 24:
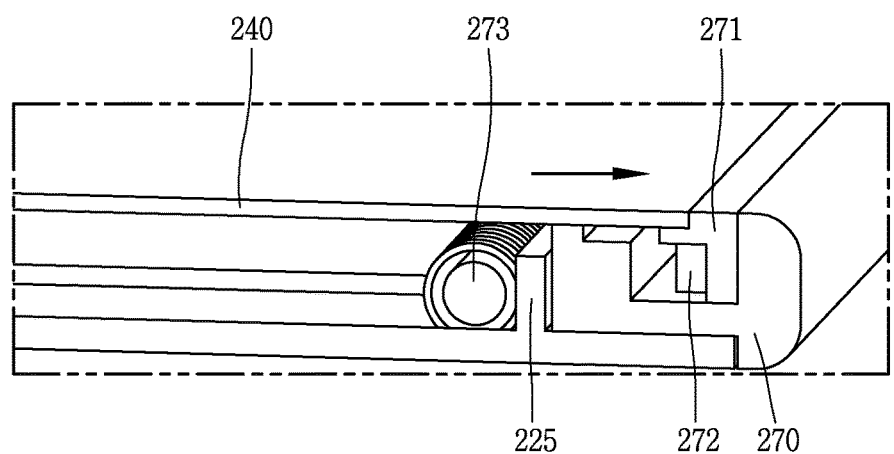
FIG. 24 illustrates an end of the second case according to an exemplary embodiment.
Figure 25:
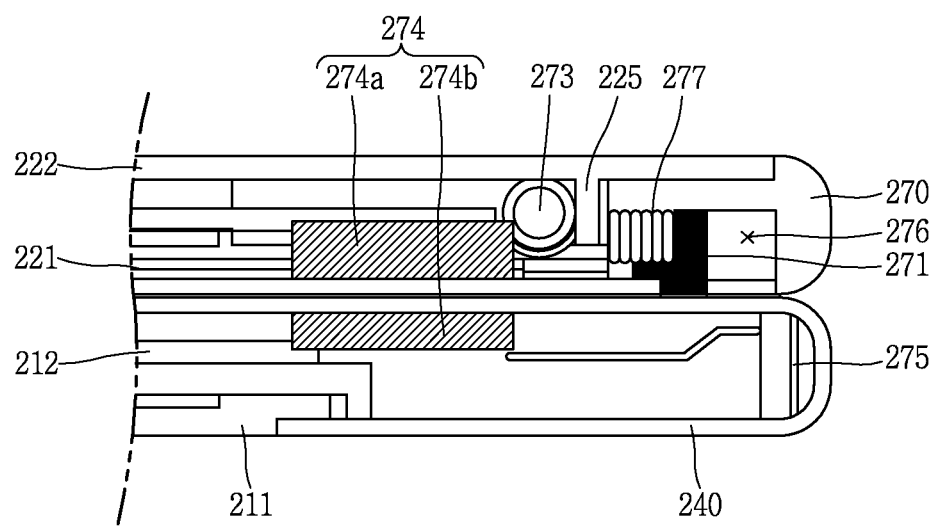
FIG. 25 illustrates ends of the first and second cases according to an exemplary embodiment.

FIG. 24 illustrates an end of the second case 220 according to an exemplary embodiment. FIG. 25 illustrates ends of the first and second cases 210 and 220 according to an exemplary embodiment.

As described above, the display 240 is divided into the first portion 241 and the second portion 242. The first portion 241 includes the first area 241a formed the front surface (the surface not exposed to the outside in the closed state) of the first case 210, the second area 241b extending from the first area 241a, the second area 241b being formed at the side surface of the first case 210, and the third area 241c extending from the second area 241b, the third area 241c being formed on the outer surface of the first case 210. In this case, a fingerprint recognition module 275 is disposed on a rear surface of the second area 241b.

The first case 210 includes a first upper case 211 formed to extend from the third area 241c and a first lower case 212 supporting the first upper case 211. The second case 220 includes a second upper case 221 formed on a rear surface of the second portion 242, a second lower case 222 supporting the second upper case 221, and an edge portion 270 formed at ends of the second upper case 221 and the second lower case 222. A supporting member 271 fixed to the second portion 242 to be integrally movable with the second portion 242 is provided inside the edge portion 270, and the edge portion 270 is provided with a space in which the supporting member 271 is movable. A top surface of the supporting member 271 is configured to form the same plane with that of the edge portion 270.

In this case, the second lower case 222 has a dividing portion 225 formed to protrude toward the second upper case 221. An electromagnet 273 is disposed at one side of the dividing portion 225, and a magnet 272 is attached to the supporting portion 271, so that the supporting member 271 can be moved by the electromagnet 273 and the magnet 272. That is, when the state of the mobile terminal 200 is switched from the closed state to the opened state, the display 240 moves in the direction of an arrow of FIG. 24. In order to provide a space 276 in which the display 240 can move without being wrinkled, the supporting member 271 is attached to the end of the second portion 242 of the display 240, and repulsion is applied between the magnet 272 attached to the supporting member 271 and the electromagnet 273, thereby moving the supporting member 271.

A spring 277 moving the supporting member 271 when the state of the mobile terminal 200 is switched to the opened state is disposed in the space 276, to complement the movement of the supporting member 271, caused by the electromagnet 273 and the magnet 272.

Magnetic members 274a and 274b (274) are respectively provided inside the first and second cases 210 and 220, so that when the state of the mobile terminal 200 is switched to the closed state, the first and second cases 210 and 220 are adhered closely to each other.

Figure 26A:
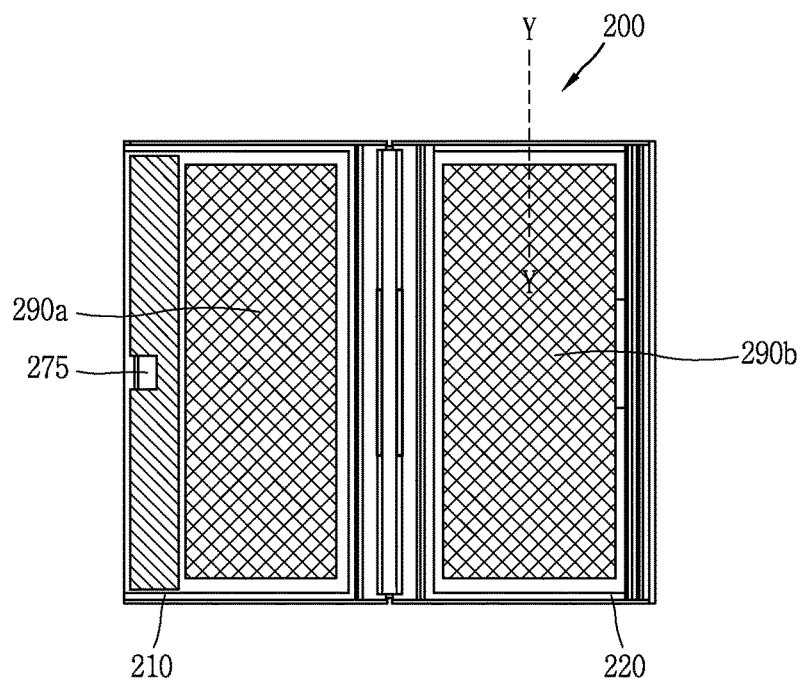
FIG. 26A is a plan view of the mobile terminal from which the display is removed according to an exemplary embodiment.
Figure 26B:
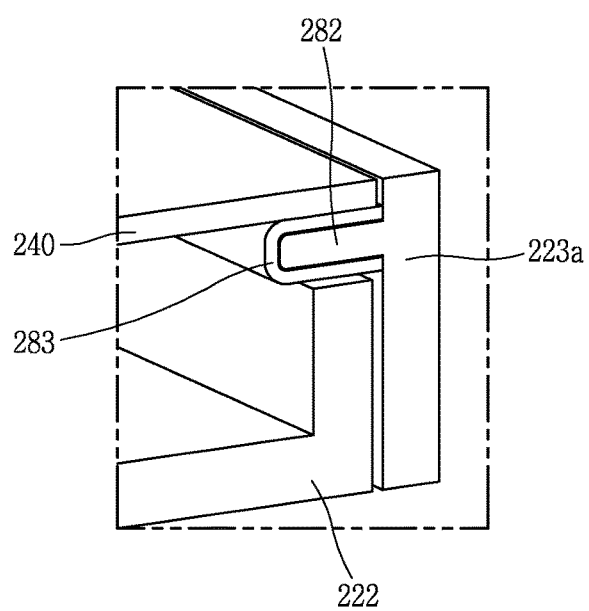
FIG. 26B is a perspective view of a portion taken along line Y-Y of FIG. 26A.

FIG. 26A is a plan view of the mobile terminal 200 from which the display is removed according to an exemplary embodiment, and FIG. 26B is a perspective view of a portion taken along line Y-Y of FIG. 26A.

Referring to FIG. 26, the vertical portion 223*a* formed at the upper and lower ends of the second body 220*a* may further include a rail 282 formed to protrude inward in parallel to the display 240, and a guide portion 283 movable on the rail 282, the guide portion 283 coupling to at least one portion of the second portion 242. The guide portion 283 may be attached to at least one portion of the display 240 to integrally move with the display 240. The guide portion 283 is made of a metal material.

Figure 27:
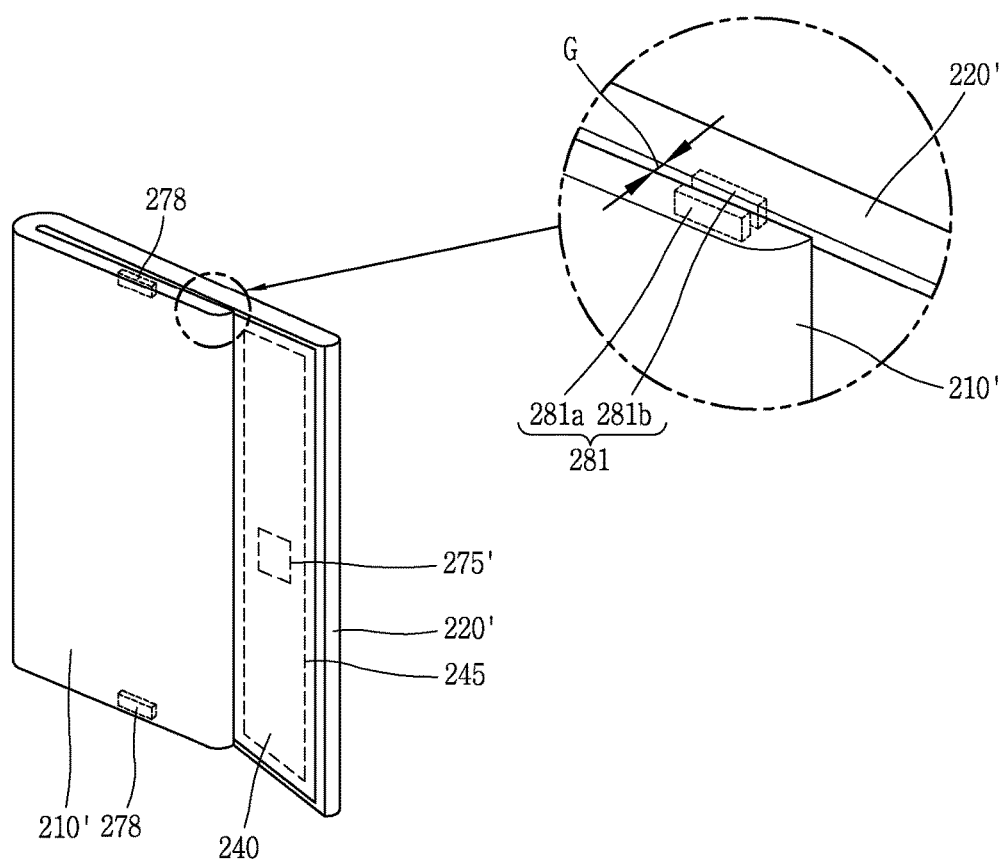
FIG. 27 is a perspective view of the mobile terminal according to an exemplary embodiment.

FIG. 27 is a perspective view of the mobile terminal 200 according to an exemplary embodiment. As shown in FIG. 27, a first case 210' may be smaller than a second case 220'. In this case, magnetic members 281*a* and 281*b* (281) may be respectively provided at an end of the first case 210' and a portion corresponding to the end of the first case 210' in a portion of the second case 220', so that the spacing distance G between the first and second cases 210' and 220' in the closed state can be minimized by the magnetic members 281*a* and 281*b* (281).

That is, the magnetic members 281*a* and 281*b* (281) are respectively provided inside the first and second cases 210' and 220' where the guide portion 283 is not formed, so that the upper and lower ends of the first and second cases 210' and 220' can be adhered closely to each other in the closed state.

In this case, a grip sensor 278 may be attached to the upper or lower end of the second case 220', to recognize a user's intention to use the mobile terminal 200 when the user grips an upper or lower end of the mobile terminal 200 to open the mobile terminal 200. When the closed state is implemented, the second case 220' may be covered by the first case 210', and a fingerprint recognition module 275' may be disposed in a remaining area 245, to recognize the user's intention to use the mobile terminal 200.

Figure 28:
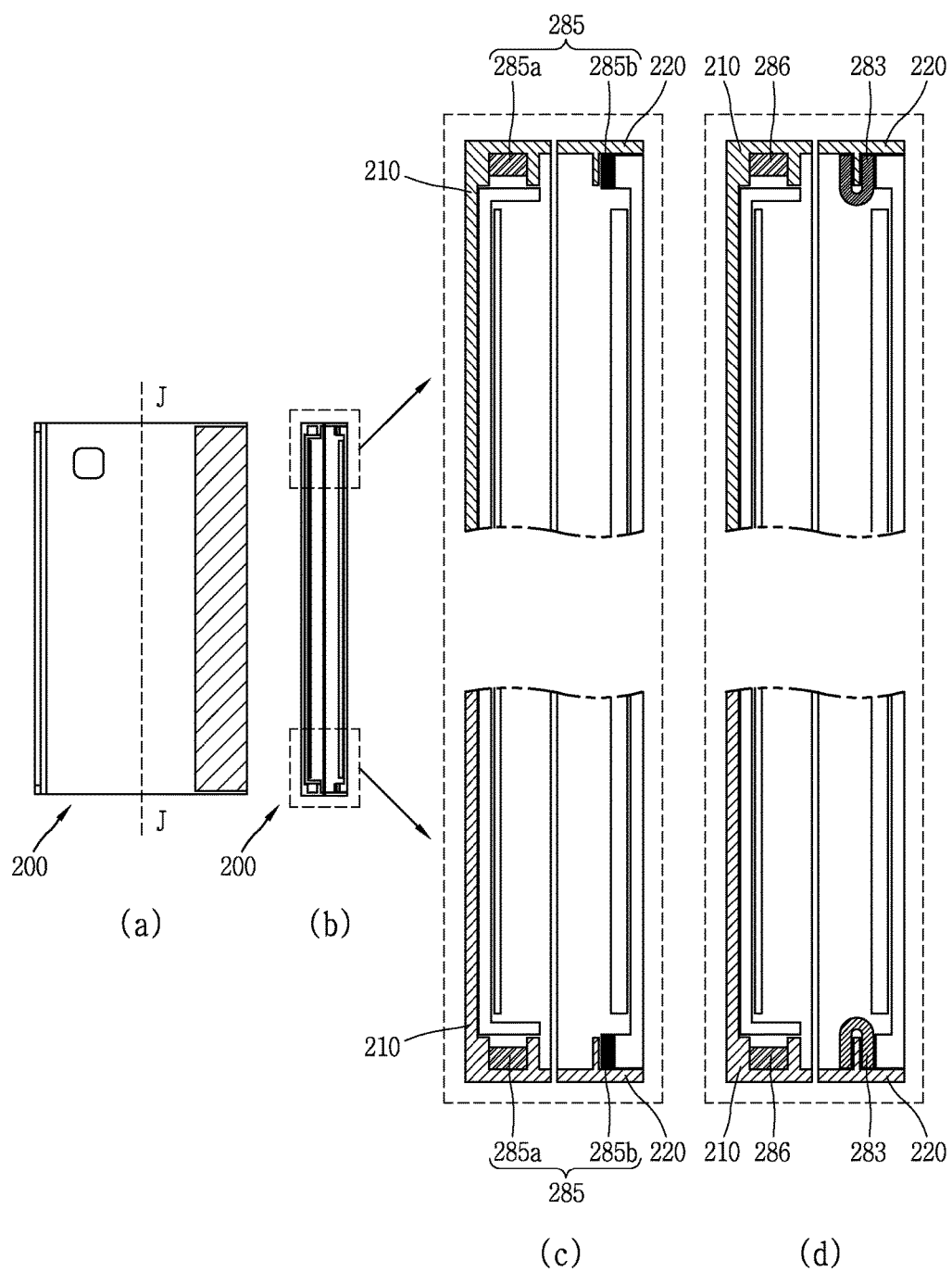
FIG. 28 illustrates plan and sectional views of the mobile terminal according to an exemplary embodiment.

FIG. 28 illustrates plan and sectional views of the mobile terminal 200 according to an exemplary embodiment. FIG. 28(*a*) is a plan view of the mobile terminal according to the exemplary embodiment, FIG. 28(*b*) is a sectional view taken along line J-J of FIG. 28(*a*), FIG. 28(*c*) is a view illustrating magnetic members 285*a* and 285*b* (285) provided at upper and lower ends of the mobile terminal 200, and FIG. 28(*d*) is a section view of the mobile terminal 200 in which the closed state of the mobile terminal 200 can be implemented by magnetic members 286 and guide members 283.

As shown in FIG. 28(*c*), the magnetic members 285*a* and 285*b* are built in the first and second cases 210 and 220, respectively. Therefore, when the closed state of the mobile terminal 200 is implemented, attraction is applied between the magnetic members 285*a* and 285*b* such that the first and second cases 210 and 220 are adhered closely to each other. When the opened state of the mobile terminal 200 is implemented, repulsion is applied between the magnetic members 285*a* and 285*b* such that the first and second cases 210 and 220 push each other. In this case, at least one of the magnetic members 285*a* and 285*b* may be an electromagnet.

As shown in FIG. 28D, the magnetic members 286 may be provided in one of the first and second cases 210 and 220, and the guide members 283 made of a metal material may be provided in the other of the first and second cases 210 and 220. In this case, the closed state of the first and second cases 210 and 220 can be more accurately implemented by attraction between the magnetic member 286 and the guide member 283.

If a user's intention to open the mobile terminal 200 is identified, the mobile terminal can be easily opened by weakening the magnetism between the magnetic member 286 and the guide member 283 or applying the opposite magnetism between the magnetic member 286 and the guide member 283.

In this case, first printed circuit boards 290*a*, 690*a*, 790*a*, 890*a*, and 990*a* are accommodated in the first cases 210, 610, 710, 810, and 910, respectively, and second printed circuit boards 290*b*, 690*b*, 790*b*, 890*b*, and 990*b* are accommodated in the second case 220, 620, 720, 820, and 920. The first printed circuit boards 290*a*, 690*a*, 790*a*, 890*a*, and 990*a* and the second printed circuit boards 290*b*, 690*b*, 790*b*, 890*b*, and 990*b* perform the function of the controller 180. Although not shown in these figures, this is identically applied to other exemplary embodiments.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic terminal, comprising:
   a first case;
   a second case relatively rotating with respect to the first case;
   coupling portions respectively coupled to ends of the first and second cases, to relatively rotate the first and second cases; and
   a display including a first portion formed on the first case, the first portion having at least one portion fixed to the first case, and a second portion integrally formed with the first portion, the second portion being disposed on the second case,
   wherein the coupling portion includes:

a first connecting portion and a second connecting portion, respectively having one end portions fixed to the ends of the first and second cases to integrally rotate with the first and second cases; and
rotating portions respectively coupled to the other end portions of the first and second connecting portions, to rotate the first and second connecting portions, and
wherein each of the first and second cases includes:
a first body and a second body, having electronic components built therein; and
a first bending portion and a second bending portion, respectively extending from the first and second bodies, the first and second bending portions bending to surround the coupling portion,
wherein each of the first and second bending portions includes a first wall portion and a second wall portion, respectively forming external appearances of upper and lower ends of the electronic terminal, and a first cover portion and a second cover portion, integrally formed with the first and second wall portions, the first and second cover portions being formed in the width direction of the electronic terminal, and
wherein the rotating portion further includes a supporting portion supporting the first rotating shaft, the second rotating shaft, and the elastic member while surrounding the first rotating shaft, the second rotating shaft, and the elastic member.

2. The electronic terminal of claim 1, wherein the one end portions of the first and second connecting portions are respectively fixed to the first and second wall portions, so that the first and second cases rotate by relative rotation of the first and second connecting portions.

3. The electronic terminal of claim 2, wherein the rotating portion includes:
a first rotating shaft and a second rotating shaft, respectively inserted and fixed into the first and second connecting portions, to be integrally rotatable with the first and second connecting portions; and
an elastic member is coupled to the first and second rotating shafts to rotate the first and second rotating shafts.

4. The electronic terminal of claim 3, wherein the coupling portions are formed at the upper and lower ends of the electronic terminal, respectively.

5. The electronic terminal of claim 1, wherein the first and second connecting portions rotate along the outer circumference of the supporting portion, and
wherein a projection is formed at each of the first and second connecting portions, and latching portions allowing rotations of the first and second connecting portions to be restricted by contacts of the first and second connecting portions with the projections are formed at the outer circumference of the supporting portion.

6. The electronic terminal of claim 5, wherein protruding portions are formed along the width directions at inner circumferential surfaces of the first and second cover portions to restrict the rotations of the first and second connecting portions, respectively.

7. The electronic terminal of claim 1, wherein magnetic members are respectively provided inside the first and second cover portions or in the first and second wall portions such that the first and second cover portions are adhered closely to each other when the first and second cases are opened.

8. The electronic terminal of claim 7, wherein the first body includes magnetic members, and the second body includes at least one guide portion made of metal material.

9. The electronic terminal of claim 1, wherein the rotating portion is a click hinge which includes a housing fixed to the first and second wall portions, and a cam portion protruding from one side of the housing to be inserted into the first or second connecting portion, the cam portion rotating the first or second connecting portion.

10. The electronic terminal of claim 9, wherein the rotating portions are disposed at upper and lower ends of the coupling portion, respectively, and one or two cam portions are used for each rotating portion,
wherein, when one cam portion is used for each rotating portion, the cam portions are located in the diagonal direction or disposed on the same line at the upper and lower ends of the coupling portion, and
wherein a projection is formed at the other side of the housing to be inserted into the first or second connecting portion exclusively from the cam portion.

11. The electronic terminal of claim 1, wherein the one end portions of the first and second connecting portions are fixed to the first and second wall portions, respectively, and the other end portions of the first and second connecting portions are fixed to the rotating portions, respectively.

12. The electronic terminal of claim 11, wherein each of the first and second connecting portions is a link or a zigzag spring.

13. The electronic terminal of claim 12, wherein, when each of the first and second connecting portions is a zigzag spring, the other end portions of the first and second connecting portions are coupled to the rotating portion, and
wherein the other ends of the first and second connecting portions are respectively fixed to a first rotating plate and a second rotating plate, which are formed at an end of the rotating portion and rotatable independently from the rotating portion.

14. The electronic terminal of claim 1, wherein the first portion includes a first area formed on a front surface of the first case, a second area extending from the first area, the second area formed on a side surface of the first case, and a third area extending from the second area, the third area formed on an outer surface of the first case, and
wherein a fingerprint recognition module is disposed on a rear surface of the second area.

15. The electronic terminal of claim 14, wherein the first case includes a first upper case formed to extend from the third area and a first lower case supporting the first upper case, and
wherein the second case includes:
a second upper case formed under the second portion;
a second lower case supporting the second upper case; and
an edge portion formed at ends of the second upper case and the second lower case,
wherein a supporting member fixed to the second portion to be integrally movable with the second portion is provided inside the edge portion, and the edge portion is provided with a space in which the supporting member is movable.

16. The electronic terminal of claim 15, wherein the second lower case has a dividing portion formed to protrude toward the second upper case, an electromagnet is disposed at one side of the dividing portion, and a magnet is attached to the supporting portion, such that the supporting member is moved by the electromagnet and the magnet, and wherein a spring moving the supporting member when the state of the electronic terminal is switched to the opened state is disposed in the space.

17. The electronic terminal of claim 1, wherein supporting members are provided inside the first and second cases, respectively, such that the first and second cases are adhered closely to each other when the state of the electronic terminal is switched to a closed state.

18. The electronic terminal of claim 1, wherein magnetic members, when the first case is smaller than the second case, are respectively provided at an end of the first case and a portion corresponding to the end of the first case in a portion of the second case.

19. An electronic terminal, comprising:
a first case;
a second case relatively rotating with respect to the first case;
coupling portions respectively coupled to ends of the first and second cases, to relatively rotate the first and second cases; and
a display including a first portion formed on the first case, the first portion having at least one portion fixed to the first case, and a second portion integrally formed with the first portion, the second portion being disposed on the second case,
wherein the coupling portion includes:
a first connecting portion and a second connecting portion, respectively having one end portions fixed to the ends of the first and second cases to integrally rotate with the first and second cases; and
rotating portions respectively coupled to the other end portions of the first and second connecting portions, to rotate the first and second connecting portions, and
wherein each of the first and second cases includes:
a first body and a second body, having electronic components built therein; and
a first bending portion and a second bending portion, respectively extending from the first and second bodies, the first and second bending portions bending to surround the coupling portion,
wherein each of the first and second bending portions includes a first wall portion and a second wall portion, respectively forming external appearances of upper and lower ends of the electronic terminal, and a first cover portion and a second cover portion, integrally formed with the first and second wall portions, the first and second cover portions being formed in the width direction of the electronic terminal,
wherein a gear is formed at the outer circumference of the rotating portion, and a first gear and a second gear, corresponding to the gear of the rotating portion, are respectively formed at portions of the first and second connecting portions, which are coupled to the rotating portion, to be gear-coupled to the rotating portion, and
wherein protruding portions are formed along the width directions at inner circumferential surfaces of the first and second cover portions to restrict the rotations of the first and second connecting portions, respectively.

20. An electronic terminal, comprising:
a first case;
a second case relatively rotating with respect to the first case;
coupling portions respectively coupled to ends of the first and second cases, to relatively rotate the first and second cases; and
a display including a first portion formed on the first case, the first portion having at least one portion fixed to the first case, and a second portion integrally formed with the first portion, the second portion being disposed on the second case,
wherein the coupling portion includes:
a first connecting portion and a second connecting portion, respectively having one end portions fixed to the ends of the first and second cases to integrally rotate with the first and second cases; and
rotating portions respectively coupled to the other end portions of the first and second connecting portions, to rotate the first and second connecting portions, and
wherein each of the first and second cases includes:
a first body and a second body, having electronic components built therein; and
a first bending portion and a second bending portion, respectively extending from the first and second bodies, the first and second bending portions bending to surround the coupling portion,
wherein each of the first and second bending portions includes a first wall portion and a second wall portion, respectively forming external appearances of upper and lower ends of the electronic terminal, and a first cover portion and a second cover portion, integrally formed with the first and second wall portions, the first and second cover portions being formed in the width direction of the electronic terminal, and
wherein a hollow portion is formed inside the rotating portion, the first and second connecting portions are flexible and integrally formed while passing through the hollow portion, and a first supporting shaft and a second supporting shaft, fixing the first and second connecting portions, are formed at both ends of the first and second connecting portions, respectively.

21. The electronic terminal of claim 20, wherein the first and second supporting shafts are fixed to the first and second wall portions of the first and second cases, respectively.

22. The electronic terminal of claim 21, wherein the first and second connecting portions are integrally formed, and each of the first and second connecting portions is a corrugated plate having a plurality of corrugations or a mesh.

23. An electronic terminal, comprising:
a first case;
a second case relatively rotating with respect to the first case;
coupling portions respectively coupled to ends of the first and second cases, to relatively rotate the first and second cases; and
a display including a first portion formed on the first case, the first portion having at least one portion fixed to the first case, and a second portion integrally formed with the first portion, the second portion being disposed on the second case,
wherein the coupling portion includes:
a first connecting portion and a second connecting portion, respectively having one end portions fixed to the ends of the first and second cases to integrally rotate with the first and second cases; and
rotating portions respectively coupled to the other end portions of the first and second connecting portions, to rotate the first and second connecting portions, and
wherein each of the first and second cases includes:
a first body and a second body, having electronic components built therein; and a first bending portion and a second bending portion, respectively extending from the first and second bodies, the first and second bending portions bending to surround the coupling portion, and wherein each of the first and second bending portions includes a first wall portion and a second wall portion, respectively forming external appearances of upper and lower ends of the electronic terminal, and a first cover portion and a second cover portion, integrally formed with the first and second wall portions, the first and second cover portions being formed in the width direction of the electronic terminal, and wherein a first joint and a second joint, respectively inserted into the first and second connecting portions, are formed at the rotating portion, and any one of the first and second joints moves in a long hole formed in a first or second connecting portion.

24. An electronic terminal, comprising:

a first case;

a second case relatively rotating with respect to the first case;

coupling portions respectively coupled to ends of the first and second cases, to relatively rotate the first and second cases; and a display including a first portion formed on the first case, the first portion having at least one portion fixed to the first case, and a second portion integrally formed with the first portion, the second portion being disposed on the second case, wherein the coupling portion includes:

a first connecting portion and a second connecting portion, respectively having one end portions fixed to the ends of the first and second cases to integrally rotate with the first and second cases; and rotating portions respectively coupled to the other end portions of the first and second connecting portions, to rotate the first and second connecting portions, and wherein each of the first and second cases includes:
  a first body and a second body, having electronic components built therein; and
  a first bending portion and a second bending portion, respectively extending from the first and second bodies, the first and second bending portions bending to surround the coupling portion, and wherein each of the first and second bending portions includes a first wall portion and a second wall portion, respectively forming external appearances of upper and lower ends of the electronic terminal, and a first cover portion and a second cover portion, integrally formed with the first and second wall portions, the first and second cover portions being formed in the width direction of the electronic terminal, and wherein the one end portions of the first and second connecting portions are fixed to a first hook and a second hook, formed at the first and second cases, respectively, and the other end portions of the first and second connecting portions are respectively a first coil spring and a second coil spring, which are mounted in a first accommodating portion and a second accommodating portion, recessed in the rotating portion.

25. An electronic terminal, comprising:

a first case;

a second case relatively rotating with respect to the first case;

coupling portions respectively coupled to ends of the first and second cases, to relatively rotate the first and second cases; and a display including a first portion formed on the first case, the first portion having at least one portion fixed to the first case, and a second portion integrally formed with the first portion, the second portion being disposed on the second case, wherein the coupling portion includes:
  a first connecting portion and a second connecting portion, respectively having one end portions fixed to the ends of the first and second cases to integrally rotate with the first and second cases; and
  rotating portions respectively coupled to the other end portions of the first and second connecting portions, to rotate the first and second connecting portions, and wherein the rotating portion includes a cylinder portion formed at an end of the first connecting portion, the cylinder portion having a hole formed therein, and a hinge shaft formed at an end of the second connecting portion, the hinge shaft being inserted into the hole such that the first and second cases are rotatable.

* * * * *